(12) United States Patent
Tsukada et al.

(10) Patent No.: US 10,083,800 B2
(45) Date of Patent: *Sep. 25, 2018

(54) ACTIVATED CARBON FOR USE IN ELECTRODE OF POWER-STORAGE DEVICE, AND METHOD FOR PRODUCING SAME

(71) Applicants: AION CO., LTD., Osaka (JP); NATIONAL UNIVERSITY CORPORATION GUNMA UNIVERSITY, Gunma (JP)

(72) Inventors: Hidehiko Tsukada, Gunma (JP); Kimiyasu Onda, Kanagawa (JP); Hiroshi Miyaji, Tokyo (JP); Soshi Shiraishi, Gunma (JP); Yukiko Endo, Gunma (JP)

(73) Assignees: AION CO., LTD., Osaka (JP); NATIONAL UNIVERSITY CORPORATION GUNMA UNIVERSITY, Gunma (JP)

( * ) Notice: Subject to any disclaimer, the term of this patent is extended or adjusted under 35 U.S.C. 154(b) by 37 days.

This patent is subject to a terminal disclaimer.

(21) Appl. No.: 15/022,091

(22) PCT Filed: Sep. 3, 2014

(86) PCT No.: PCT/JP2014/073146
§ 371 (c)(1),
(2) Date: Mar. 15, 2016

(87) PCT Pub. No.: WO2015/041051
PCT Pub. Date: Mar. 26, 2015

(65) Prior Publication Data
US 2016/0225537 A1    Aug. 4, 2016

(30) Foreign Application Priority Data

Sep. 20, 2013 (JP) ................................ 2013-195919

(51) Int. Cl.
| | | |
|---|---|---|
| *H01G 11/24* | (2013.01) | |
| *H01G 11/34* | (2013.01) | |
| *H01G 11/42* | (2013.01) | |
| *H01G 11/26* | (2013.01) | |
| *H01G 11/50* | (2013.01) | |
| *H01G 11/86* | (2013.01) | |
| *C01B 32/354* | (2017.01) | |
| *C01B 32/336* | (2017.01) | |

(52) U.S. Cl.
CPC .......... *H01G 11/34* (2013.01); *C01B 32/336* (2017.08); *C01B 32/382* (2017.08); *H01G 11/24* (2013.01); *H01G 11/26* (2013.01); *H01G 11/42* (2013.01); *H01G 11/50* (2013.01); *H01G 11/86* (2013.01); *Y02E 60/13* (2013.01)

(58) Field of Classification Search
CPC ........ H01G 11/24; H01G 11/34; H01G 11/42; H01G 11/26; H01G 11/50; H01G 11/86; C01B 32/336; Y02E 60/13
USPC ............................... 252/502; 423/460, 445 R
See application file for complete search history.

(56) References Cited

U.S. PATENT DOCUMENTS

| | | | | |
|---|---|---|---|---|
| 8,313,723 B2* | 11/2012 | Istvan | ....................... | D01F 9/20 423/447.1 |
| 8,809,230 B2* | 8/2014 | Worsley | ................... | B01J 21/18 252/502 |
| 9,424,996 B2* | 8/2016 | Hayashi | ................. | H01G 9/048 |
| 2008/0220329 A1* | 9/2008 | Kojima | ................... | C04B 35/83 429/188 |
| 2015/0049415 A1* | 2/2015 | Tsukada | ................... | B01J 6/008 361/502 |
| 2016/0300666 A1* | 10/2016 | Kamijo | ................. | H01G 11/06 |

FOREIGN PATENT DOCUMENTS

| | | |
|---|---|---|
| CN | 101384508 A | 3/2009 |
| CN | 101585527 A | 11/2009 |
| CN | 102502624 A | 6/2012 |
| CN | 103229262 A | 7/2013 |
| JP | 60-149115 A | 8/1985 |
| JP | H01-046913 A | 2/1989 |
| JP | H1-46913 A | 2/1989 |
| JP | H4-44407 B2 | 7/1992 |
| JP | Hei4-44407 A | 7/1992 |

(Continued)

OTHER PUBLICATIONS

Machine Translation of JP 2010-267878, Nov. 25, 2010.*
Translation of JP 2010267878, Nov. 25, 2010. (Year: 2010).*
International Preliminary Report on Patentability issued with respect to Application No. PCT/JP2014/073146, dated Mar. 31, 2016.

(Continued)

*Primary Examiner* — Douglas J McGinty
(74) *Attorney, Agent, or Firm* — Greenblum & Bernstein, P.L.C.

(57) ABSTRACT

First, the present invention involves adding a curing catalyst to a phenolic resin, polyvinyl alcohol, a pore-forming agent, and a cross-linking agent, and mixing, casting, heating, and drying the same. Next, the plate-shaped porous phenolic resin obtained thereby which has uniform consecutive macropores having an average pore diameter in the range of 3 to 35 μm and formed in a three-dimensional network pattern is immersed with an organic solvent. Thereafter, this block is extracted and pressure is applied thereto. It is possible to obtain plate-shaped activated carbon for use in an electrode of a power-storage device by carbonizing and activating a block which has undergone this procedure by keeping the same at an increased temperature.

18 Claims, 25 Drawing Sheets

(56) References Cited

FOREIGN PATENT DOCUMENTS

| JP | H5-115775 A | 5/1993 |
| JP | H05-115775 A | 5/1993 |
| JP | H05-217803 A | 8/1993 |
| JP | 2005-187320 A | 7/2005 |
| JP | 2010-267878 A | 11/2010 |
| WO | 2007/095023 A2 | 8/2007 |
| WO | 2012/087497 A1 | 6/2012 |

OTHER PUBLICATIONS

International Search Report issued with respect to application No. PCT/JP2014/073146, dated Dec. 9, 2014.
Takoshitsu Kyuchakuzai Handbook (Handbook of Porous Adsorbent), 2nd printing, p. 444 (Aug. 24, 2005), Fuji Technosystem Co., Ltd.
Kasseitan-no-oyougijutsu (Advanced Technology of Activated Carbon), 1st edition and printing, p. 81, Table 2.3.5 (Jul. 25, 2000), Fuji Technosystem Co., Ltd.
2011-nendo Tansozairyogakkai Nenkaiyoshi (Proceedings of the 2011 Annual Meeting of the Carbon Society of Japan), p. 44, "Production of Carbon Porous Material Using Porous Polyacrylonitrile as Precursor and Application for Electrode".
Korean Notice of Preliminary Rejection with respect to Application No. 10-2015-7035778, dated Jun. 22, 2017.
Japanese Notification of Reasons for Refusal for Patent Application No. 2013-195919 dated Oct. 3, 2017.
Chinese First Office Action from Patent Application No. 201480049866.X dated Aug. 21, 2017.

* cited by examiner (a)

(b)

(a)

(b)

EXAMPLE 1

(a)

(b)

EXAMPLE 2

(a)

(b)

EXAMPLE 3

(a)

(b)

EXAMPLE 4

(a)

(b)

EXAMPLE 5

(a)

(b)

COMPARATIVE EXAMPLE (a)

(b)

COMPARATIVE EXAMPLE (a)

(b)

COMPARATIVE EXAMPLE

ACTIVATED CARBON FOR USE IN ELECTRODE OF POWER-STORAGE DEVICE, AND METHOD FOR PRODUCING SAME

TECHNICAL FIELD

The present invention relates to an activated carbon for use in an electrode of a power-storage device such as an electric double layer capacitor and a lithium ion capacitor and a method for producing the activated carbon.

The present application is to claim a right of priority according to JP-A-2013-195919 filed on Sep. 20, 2013, and to herein incorporate by reference.

BACKGROUND ART

An electric double layer capacitor for repeated use by charging is known as a capacitor for storing electric charge in an adsorbed layer of ions formed in pores of a porous carbon electrode such as activated carbon, i.e., an electric double layer. With longer life and higher output, the electric double layer capacitor has been widely used as a power source for computer memory backup, particularly as a power storage system in railroad vehicles and an auxiliary power in hybrid vehicles.

Nowadays, to improve the energy density of an electric double layer capacitor, hybrid capacitors, which use not only an activated carbon electrode but also an active material of a secondary cell as an electrode material, are being developed. Illustrative example thereof includes a lithium ion capacitor. The lithium ion capacitor includes an activated carbon on a positive electrode, a carbon material for a negative electrode of a lithium ion cell on a negative electrode, and an organic electrolyte for a lithium ion cell as an electrolyte.

As shown in FIG. 24, an electric double layer capacitor is charged by connecting a power source between activated carbon electrodes of a positive electrode and a negative electrode immersed with an electrolyte to apply voltage. During charging, electrolyte ions adsorb on a surface of each electrode. Specifically, negative ions (−) in the electrolyte are attracted to positive holes (h+) of the positive electrode, and positive ions (+) in the electrolyte are attracted to electrons (e−) of the negative electrode. Both combinations of a positive hole (h+) and a negative ion (−), and an electron (e−) and a positive ion (+) are oriented at an extremely small distance of approximately few Å to form an electric double layer. This state is kept, even with the power source being disconnected, and the storage state is maintained without using any chemical reaction. During discharging, positive ions and negative ions which have been adsorbed to respective electrode desorb therefrom. Specifically, return of the electrons (e−) to the positive electrode leads to fewer positive holes (h+) and then diffusion of positive ions and negative ions in the electrolyte again. Consequently, since both charging and discharging processes cause no change on a capacitor material, heat generation or degradation by chemical reaction is not found to ensure longer life of the capacitor.

An electric double layer capacitor is characterized by technological advantages over a secondary cell: (1) capability of charging and discharging at a high rate, (2) high reversibility of charging and discharging cycles, (3) longer cycle life, and (4) environmentally friendly property due to no use of heavy metal in an electrode or an electrolyte. These characteristics are associated with no use of heavy metal in an electric double layer capacitor, operation by ion's physical adsorption and desorption, and no electron transfer reaction of chemical species.

Since the energy (E) stored in an electric double layer capacitor increases in proportion to the product of the square of the charging voltage (V) and the electric double layer capacitance (C) ($E=CV^2/2$), energy density is effectively improved by improvement in capacitance and charging voltage. The charging voltage of the electric double layer capacitor is normally suppressed to about 2.5V. This is primarily because charging with a voltage of 3V or more starts electrolysis between electrodes and an electrolyte to reduce the capacitance and degrades the electric double layer capacitor.

A practical activated carbon for use in an electrode of an electric double layer capacitor is currently produced, as shown in FIG. 25, by adding an appropriate amount of a conductive auxiliary agent such as carbon black to activated carbon particles with a diameter of 1 to 10 μm and molding the same into a sheet shape using a fibrillated binder such as polytetrafluoroethylene. It can be thought that a decline in capacitance of the electric double layer capacitor when charged with a voltage of 3V or more is caused not only by an activated carbon or an electrolyte, but also by a binder comprising an activated carbon for use in an electrode or a conductive auxiliary agent.

To achieve a higher capacitance of an electric double layer capacitor, which, however, doesn't solve the above capacitance reduction, an activated carbon for use in an electrode containing no binder or conductive material, or a seamless activated carbon for use in an electrode in which no contact interface between activated carbon particles is found has been proposed (e.g., see Non-patent document 1). Non-patent document 1 discloses a method for directly preparing an activated carbon for use in an electrode without using a binder by using a characteristic of a sol-gel process excellent in moldability. The capacitance of an electrode composed of an activated carbon prepared by the above method (binder-free electrode) is higher than that of an activated carbon prepared by using a binder. It was also confirmed that the thicker an activated carbon for use in an electrode is, the more remarkable difference in capacitance becomes.

A carbon material with a specific surface area of about 1000 $m^2/g$ having a microporous structure prepared by firing a polyacrylonitrile polymer (PAN) porous body is disclosed (see e.g. Non-patent document 2) for another seamless activated carbon for use in an electrode. An activated carbon for use in an electrode shown in Non-patent document 2 is produced by dissolving PAN in a mixed solvent of dimethyl sulfoxide and water by heating and agitating the same, heating a cooled molded object in the air at 230° C. for 1 hour, and further heating the same in carbon dioxide/argon atmosphere at 900° C. for 2 hours.

Further, another method for producing an activated carbon for use in an electrode is to mold a tablet-shaped carbon material without using a binder (see e.g. Patent document 1). Specifically, Patent document 1, a tablet-shaped carbon material is produced by reacting a phenolic compound and an aldehyde compound in a disk-shaped vessel in the presence of water and a catalyst to obtain a tablet-shaped wet gel, substituting water in the wet gel with a hydrophilic organic solvent and freezing dry the wet gel to obtain a tablet-shaped dried gel, and firing the tablet-shaped dried gel in inert atmosphere. A tablet-shaped carbon material molded without using a binder by the method includes a microstructure such as a micropore with a diameter of under 2 nm and a mesopore (a pore with a diameter of 2 to 50 nm).

Also, a block of an activated carbonized resin porous body substantively having a continuous pore structure which includes open pores is disclosed (see e.g. Patent document 2). Herein, an activated carbon block obtained by carbonizing and activating a phenolic resin molded object is disclosed as a preferable example.

PRIOR ART DOCUMENTS

Patent Documents
Patent document 1: JP-A-2005-187320 (paras [0014] and [0033], specification)
Patent document 2: JP-A-5-217803 (paras [0043] to [0054], specification)
Non-Patent Documents
Non-patent document 1: Takoshitsu Kyuchakuzai Handbook (Handbook of Porous Adsorbent), $2^{nd}$ printing, P. 444 (Aug. 24, 2005), Fuji Technosystem Co., Ltd.
Non-patent document 2: 2011-nendo Tansozairyogakkai Nenkaiyoshi (2011 Annual Outline of the Carbon Society of Japan), P. 41, "Takoshitsu-Polyacrylonitrile-o-zenkutaitosuru-tansotako utai-no-sakusei-to-denkyoku-henooyou (Preparation of Carbon Porous Body Using Porous Polyacrylonitrile as Precursor and Application for Electrode)"
Non-patent document 3: Kasseitan-no-oyougijutsu (Advanced Technology of Activated Carbon), $1^{st}$ edition and printing, P. 81, Table 2.3.5 (Jul. 25, 2000), Fuji Technosystem Co., Ltd.

SUMMARY OF THE INVENTION

Problems to be Solved by the Invention

However, fibrous-shaped activated carbons, mainly composed of such polyacrylonitrile as disclosed in Non-patent document 1, are marketed, but not in use as a capacitor. It is estimated that this is because even if a carbonized product composed of polyacrylonitrile is sufficiently activated, a resulting specific surface area is not large enough to reach 1500 $m^2/g$ or more and fails to obtain a substantive capacitance. This technical disadvantage is substantiated by Non-patent document 3 which discloses a specific surface area of 1250 $m^2/g$ or less of a polyacrylonitrile fibrous-shaped activated carbon.

In addition, activation of a carbon material several hundred μm or more thick requires a macropore as a pore whose diameter is over 50 nm to feed an activation gas and an activation chemical into a carbon material. Also, a macropore is effective in infiltrating an electrolyte for an electric double layer capacitor or for a lithium ion capacitor into an activated carbon electrode several hundred μm or more thick. However, a tablet-shaped carbon produced by the method of the above Patent document 1 has micropores and a microstructure such as mesopores, but no macropores. Therefore, a carbon material is not sufficiently activated, and an electrolyte is not sufficiently infiltrated into the carbon electrode, resulting in an unfavorably low capacitance.

Meanwhile, the activation yields of reference examples 1 and 2 of Patent document 2 are estimated to be 81% and 74%, respectively in view of each density, assuming that activation causes no volume shrinkage. Unfortunately, these activation yields are not determined to provide a capacitor using an organic electrolyte with sufficient capacitance and durability due to a specific surface area ranging from about 1000 to 1200 $m^2/g$. As shown in micrographs of Examples 1 and 2 of Patent document 2, macropores are estimated non-uniform with a pore diameter of approx. 50 μm. With such a large pore diameter, the wall thickness of a carbon matrix to be activated is of tens of μm, which makes it hard for the electrode to be uniformly and sufficiently activated therein. Moreover, if macropores are non-uniform, the thickness of a carbon matrix is also non-uniform, so the extent of activation differs on a micro basis. Accordingly, open cells (hereinafter referred to as "consecutive macropores") are disadvantageously not uniform and are not of a constant dimeter or less.

Accordingly, the inventions in the above Patent documents and Non-patent documents unfortunately fail to achieve an activated carbon for use in an electrode of a power-storage device not only having a high capacitance during charging and discharging at a high current density (2000 mA/g), but also suitable for an electric double layer capacitor excellent in durability to high-voltage (3V or more) charge and a lithium ion capacitor, excellent in durability to high-voltage (4V or more) charge, and an activated carbon for use in an electrode of a power-storage device.

Further, as described in the prior art of Patent document 2, a higher bulk density of an activated carbon has been demanded in order to make an electric double layer capacitor smaller in size and larger in capacitance.

It is an object of the present invention to provide an activated carbon for use in an electrode of a power-storage device not only having a high volumetric capacitance during charging and discharging at a high current density (2000 mA/g), but also suitable for an electric double layer capacitor excellent in durability to high-voltage (3V or more) charge and a lithium ion capacitor excellent in durability to high-voltage (4V or more) charge, and a power-storage device and a method for producing the same.

Means for Solving the Problem

A first aspect of the present invention is an activated carbon for use in an electrode of a power-storage device, wherein the activated carbon comprises uniform consecutive macropores, the size of the macropores distributed is centered in the range of 0.01 to 5 μm, the specific surface area is in the range of 1500 to 2700 $m^2/g$, the micropore volume is in the range of 0.55 to 1.0 ml/g, the average micropore width is in the range of 0.79 to 0.95 nm, and the bulk density is in the range of 0.49 to 1.0 $gcm^{-3}$.

A second aspect of the present invention is an electric double layer capacitor, wherein the activated carbon according to the first aspect is used for an electrode.

A third aspect of the present invention is a lithium ion capacitor, wherein the activated carbon according to the first aspect is used for an electrode.

A fourth aspect of the present invention is a method for producing an activated carbon for use in an electrode of a power-storage device, comprising the steps of:
adding a pore-forming agent and a cross-linking agent to an aqueous solution prepared by mixing a phenolic resin and polyvinyl alcohol and mixing the same to obtain a mixture, adding and mixing a catalyst for curing the mixture to obtain a reaction liquid, casting the reaction liquid into a predetermined plate-shaped mold, heating and reacting the same for predetermined hours to obtain a reaction product, taking out from the mold and cleaning with water the reaction product, removing the pore-forming agent and an unreacted product therefrom, and drying the same to obtain a plate-shaped porous phenolic resin including uniform consecutive macropores having an average pore diameter in the range of 3 to 35 µm and formed in a three-dimensional network pattern;

immersing the plate-shaped porous phenolic resin with an organic solvent;

pressurizing the plate-shaped porous phenolic resin after taking out the immersed plate-shaped porous phenolic resin from the organic solvent;

heating the plate-shaped porous phenolic resin pressurized to a temperature in the range of room temperature to 700 to 1000° C. in inert gas atmosphere, keeping the temperature in inert gas atmosphere, and carbonizing the plate-shaped porous phenolic resin to obtain a plate-shaped carbonized product; and activating the plate-shaped carbonized product so that the activation yield is in the range of 40 to 70% to obtain a plate-shaped activated carbon.

A fifth aspect of the present invention is the invention according to the fourth aspect, wherein the organic solvent is ketone or alcohol.

A sixth aspect of the present invention is the invention according to the fifth aspect, wherein the ketone is acetone.

A seventh aspect of the present invention is the invention according to the fourth aspect, wherein the plate-shaped carbonized product is activated by heating the same from room temperature to a temperature in the range of 800 to 900° C. in inert gas atmosphere and keeping the same under carbon dioxide circulation at the increased temperature.

An eighth aspect of the present invention is the invention according to the fifth aspect, wherein the plate-shaped carbonized product is activated by heating the same from room temperature to a temperature in the range of 800 to 900° C. in inert gas atmosphere and keeping the same under carbon dioxide circulation at the increased temperature.

A ninth aspect of the present invention is the invention according to the sixth aspect, wherein the plate-shaped carbonized product is activated by heating the same from room temperature to a temperature in the range of 800 to 900° C. in inert gas atmosphere and keeping the same under carbon dioxide circulation at the increased temperature.

A tenth aspect of the present invention is the invention according to the fourth aspect, wherein the predetermined shape of the mold is a block or plate, and when the predetermined shape of the mold is a block, a step of cutting out the dried reaction product in the form of a plate is included.

An eleventh aspect of the present invention is an electric double layer capacitor, wherein an activated carbon produced by the method according to the fourth aspect is used for an electrode.

A twelfth aspect of the present invention is an electric double layer capacitor, wherein an activated carbon produced by the method according to the fifth aspect is used for an electrode.

A thirteenth aspect of the present invention is an electric double layer capacitor, wherein an activated carbon produced by the method according to the sixth aspect is used for an electrode.

A fourteenth aspect of the present invention is an electric double layer capacitor, wherein an activated carbon produced by the method according to the seventh aspect is used for an electrode.

A fifteenth aspect of the present invention is a lithium ion capacitor, wherein an activated carbon produced by the method according to the fourth aspect is used for an electrode.

A sixteenth aspect of the present invention is a lithium ion capacitor, wherein an activated carbon produced by the method according to the fifth aspect is used for an electrode.

A seventeenth aspect of the present invention is a lithium ion capacitor, wherein an activated carbon produced by the method according to the sixth aspect is used for an electrode.

An eighteenth aspect of the present invention is a lithium ion capacitor, wherein an activated carbon produced by the method according to the seventh aspect is used for an electrode.

Effects of the Invention

An activated carbon for use in an electrode of a power-storage device of the first aspect of the present invention comprises uniform consecutive macropores, wherein the size of the macropores distributed is centered in the range of 0.01 to 5 µm, the specific surface area is in the range of 1500 to 2700 m$^2$/g, the micropore volume is in the range of 0.55 to 1.0 ml/g, the average micropore width is in the range of 0.79 to 0.95 nm, and the bulk density is in the range of 0.49 to 1.0 gcm$^{-3}$. Accordingly, the activated carbon for use in an electrode of a power-storage device not only having a high volumetric capacitance during charging and discharging at a high current density (2000 mA/g), but also suitable for an electric double layer capacitor excellent in durability to high-voltage (3V or more) charge and a lithium ion capacitor excellent in durability to high-voltage (4V or more) charge is obtained.

In the method of the fourth aspect of the present invention, by immersing with an organic solvent, taking out, pressurizing, carbonizing, and activating a plate-shaped porous phenolic resin including uniform consecutive macropores having an average pore diameter in the range of 3 to 35 µm and formed in a three-dimensional network pattern, higher density and activation of a carbonized product are sufficiently performed by the pressurization. Since no contact interface between activated carbon particles without containing binder or conductive auxiliary agent is found, an activated carbon for use in an electrode of a power-storage device not only having a high volumetric capacitance during charging and discharging at a high current density (2000 mA/g), but also suitable for an electric double layer capacitor excellent in durability to high-voltage (3V or more) charge and a lithium ion capacitor excellent in durability to high-voltage (4V or more) charge can be obtained.

EMBODIMENTS OF THE INVENTION

First, an embodiment of the present invention will be outlined with reference to the drawings.

Figure 1:
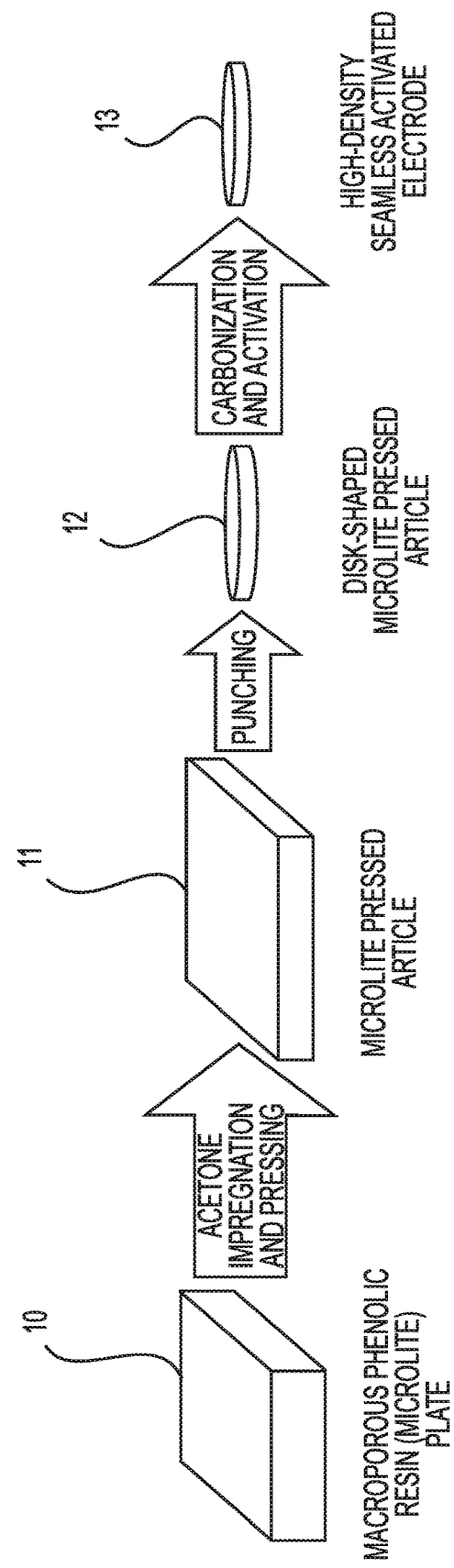
FIG. 1 is a schematic diagram showing a method for producing an activated carbon for use in an electrode of a power-storage device of an embodiment of the present invention.

As shown in FIG. 1, in a method for producing an activated carbon for use in an electrode of a power-storage device of the present invention, a block of a porous phenolic resin including consecutive macropores having an average pore diameter in the range of 3 to 35 μm is cut out in the form of a plate and formed in a three-dimensional network pattern. The cut-out block composed of the porous phenolic resin is impregnated with acetone for 1 to 10 minutes. After taking out the block from the acetone, the block is pressed at a temperature of 50 to 70° C. The pressing pressure is 1.8 ton or more. A plate-shaped body 10 composed of the pressurized porous phenolic resin is cut out, e.g., in the shape of a disk 12. The cut-out disk 12 is heated from room temperature to a temperature in the range of 700 to 1000° C. in inert gas atmosphere and kept at the temperature in inert gas atmosphere to carbonize the disk 12 to obtain a carbonized product in the shape of disk 12. The carbonized product is heated from room temperature to a temperature in the range of 800 to 900° C. in inert gas atmosphere, and carbon dioxide is circulated so that the activation yield is in the range of 40 to 70% and kept at the increased temperature to activate the carbonized product to obtain an activated carbon 13 in the shape of disk 12.

Next, an embodiment of the present invention will be described in details.

(a) Production of a Porous Phenolic Resin

A porous phenolic resin as a raw material of the method for producing the same and as a precursor of an activated carbon electrode is produced for example by the following method.

First, after a pore-forming agent and a cross-linking agent are added to an aqueous solution prepared by mixing a phenolic resin and polyvinyl alcohol to prepare a mixture, a catalyst for curing the mixture is added thereto and mixed. Subsequently, a reaction liquid obtained by adding water to the mixture to be mixed is cast into a predetermined shape of mold composed of a synthetic resin, heated and reacted for predetermined hours. After taking out a resultant reaction product from the mold, the product is cleaned with water and a pore-forming agent is removed and dried. By this method, a block of a porous phenolic resin including consecutive macropores having an average pore diameter in the range of 3 to 35 μm and formed in a three-dimensional network pattern is obtained. The method for producing a phenolic resin block described in Patent document 2 disperses a lipophilic compound in a phenolic resin. Specifically, this method adjusts a pore diameter at an agitation speed during agitation and fails to uniformly adjust the micropore diameter due to velocity gradient in a solution. Although Patent document 2 also describes a method for dispersing, evaporating and foaming a foaming agent in a phenolic resin, resulting expansion molding fails to have a smaller diameter of a micropore and cannot uniformly adjust the pore diameter. In contrast, the method for producing a phenolic resin block of the present invention mixes a pore-forming agent with a phenolic resin and can uniformly adjust the diameter of consecutive micropores by selecting the type, amount and temperature of a pore-forming agent to obtain a uniform porous phenolic resin block having an average pore diameter of 3 to 35 μm. In fact, the predetermined shape of the mold is a block or plate. If the predetermined shape of the mold is a block, as described below, a dried reaction product as a block of a porous phenolic resin is cut out in the form of a plate, and if the predetermined plate shape of the mold is a plate shape, a plate-shaped dried reaction product is used without any processing or the surface is ground and processed so as to have a predetermined thickness.

(b) Process of Immersing and Pressing

Figure 2:
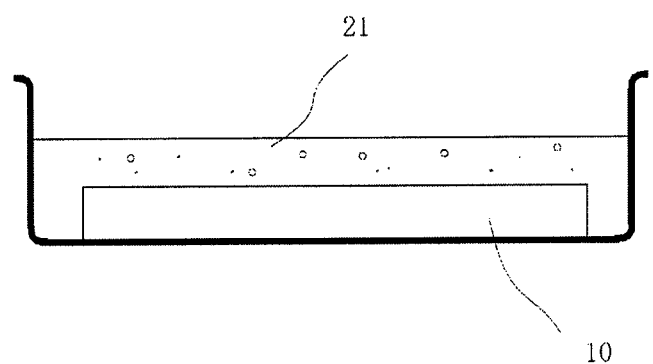
FIG. 2 is a schematic diagram showing the process of immersing and pressurizing in a method for producing an activated carbon for use in an electrode of a power-storage device of an embodiment of the present invention.
Figure 2:
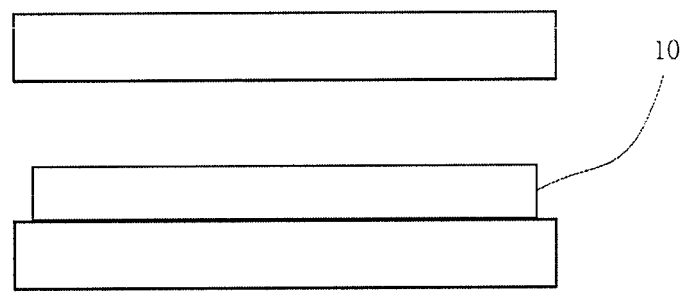
Figure 3:
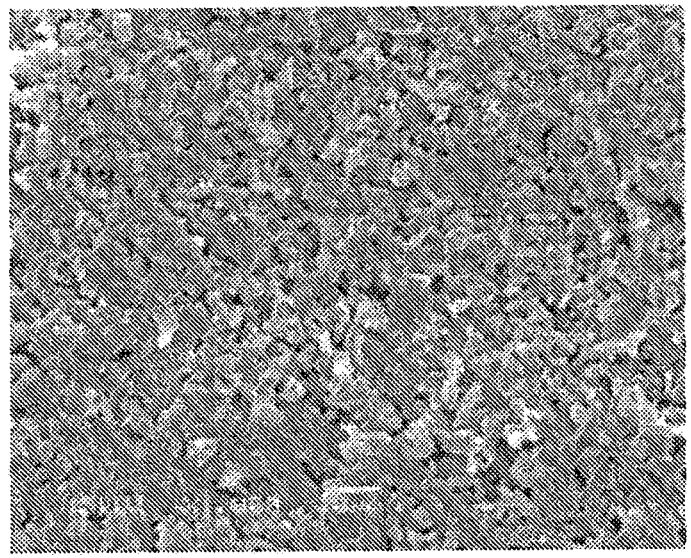
FIG. 3 is a diagram showing a photo of a scanning electron microscope of a surface of an activated carbon of Example 1 (magnification: 1000 and 4000 times)
Figure 3:
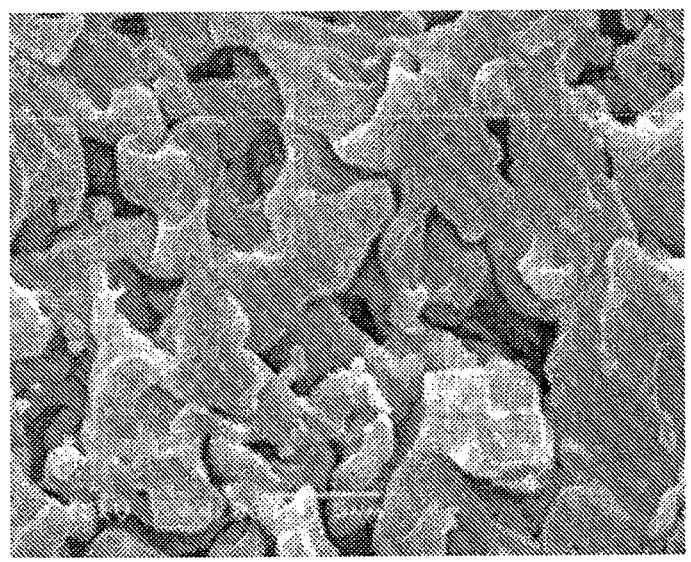
Figure 4:
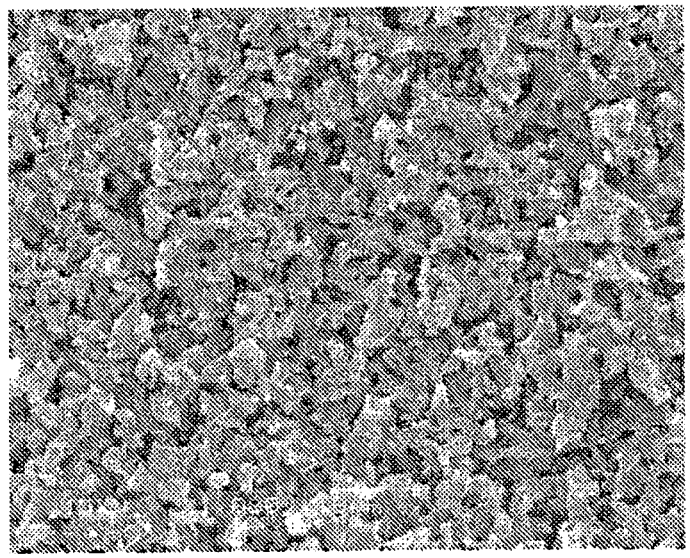
FIG. 4 is a diagram showing a photo of a scanning electron microscope of a surface of an activated carbon of Example 2 (magnification: 1000 and 4000 times)
Figure 4:
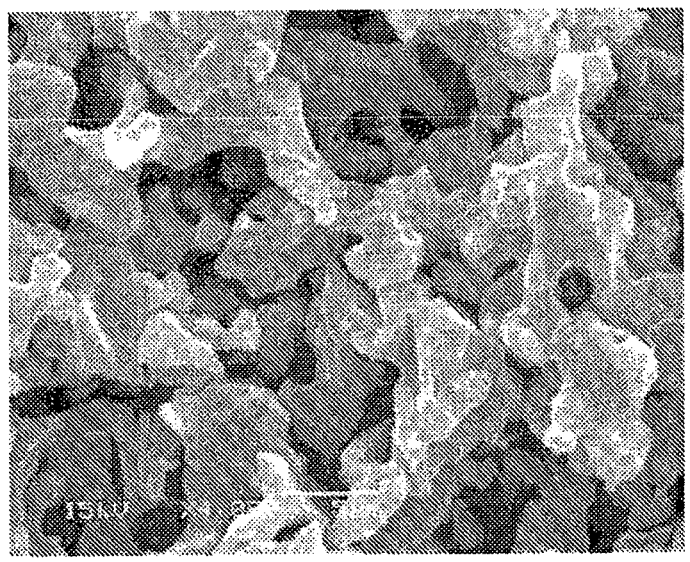
Figure 5:
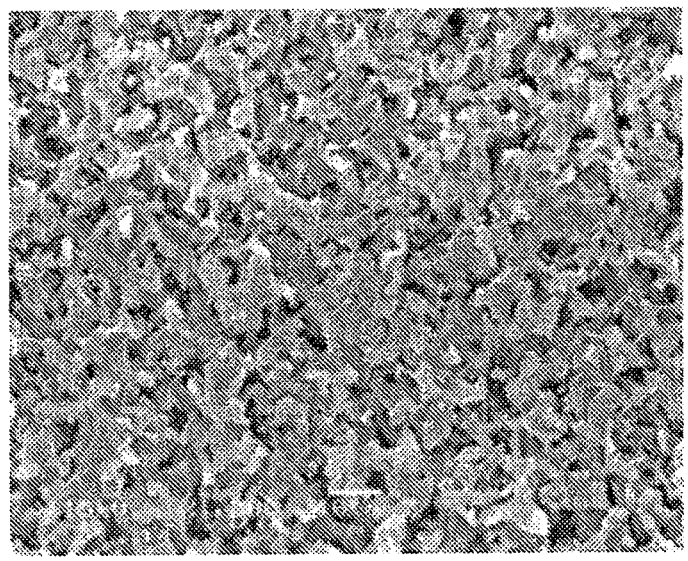
FIG. 5 is a diagram showing a photo of a scanning electron microscope of a surface of an activated carbon of Example 3 (magnification: 1000 and 4000 times)
Figure 5:
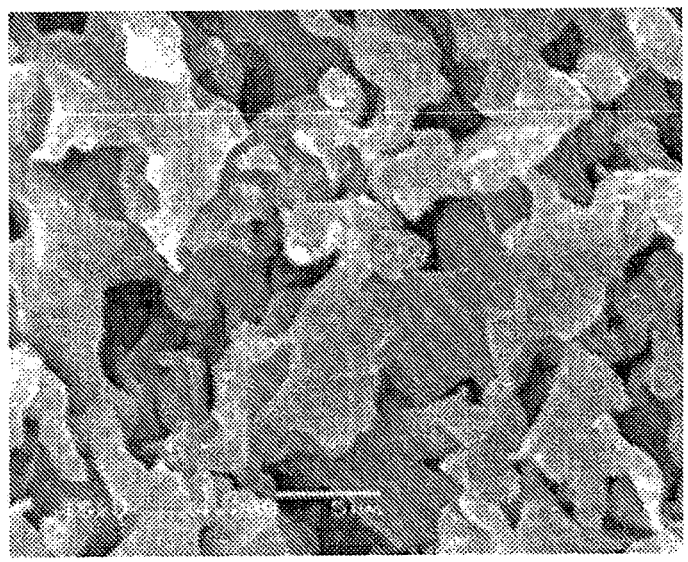
Figure 6:
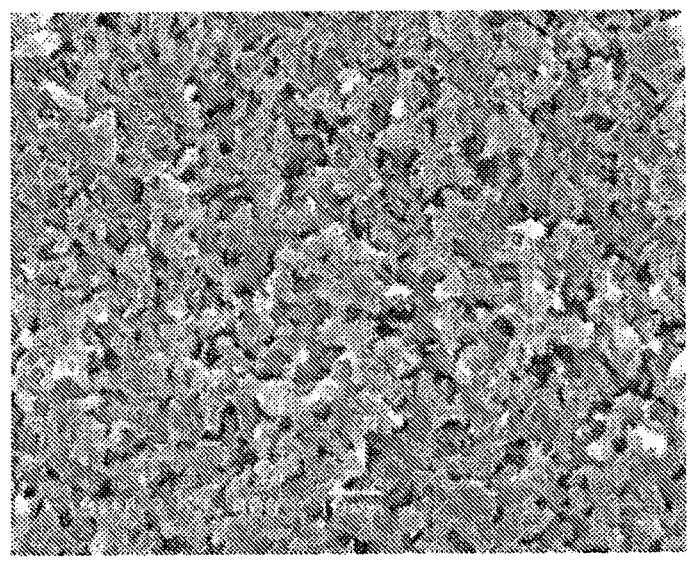
FIG. 6 is a diagram showing a photo of a scanning electron microscope of a surface of an activated carbon of Example 4 (magnification: 1000 and 4000 times)
Figure 6:
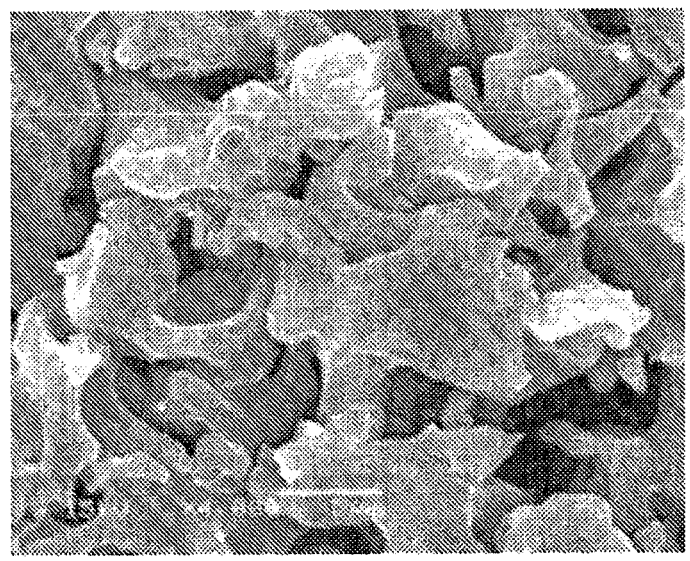
Figure 7:
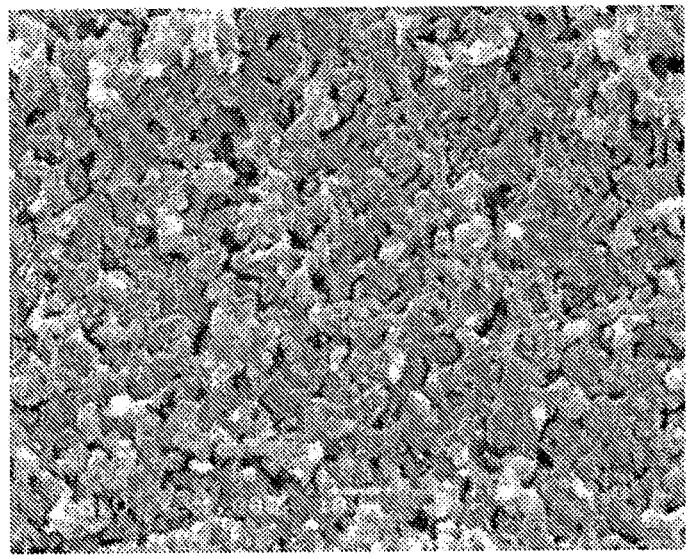
FIG. 7 is a diagram showing a photo of a scanning electron microscope of a surface of an activated carbon of Example 5 (magnification: 1000 and 4000 times)
Figure 7:
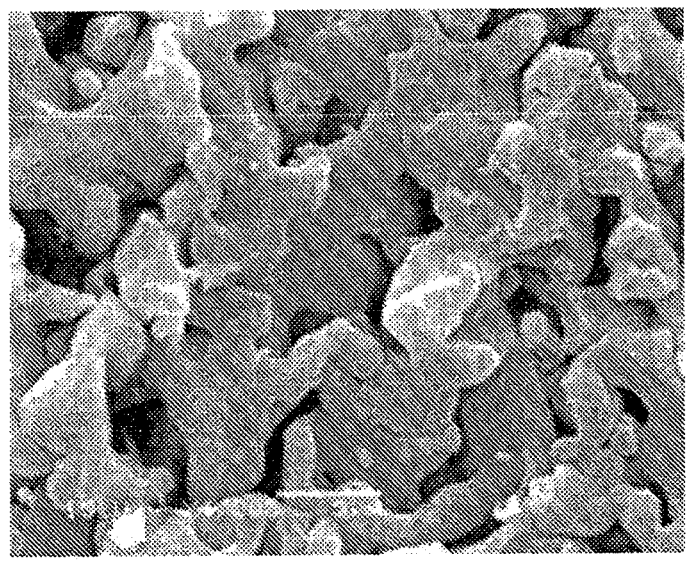
Figure 8:
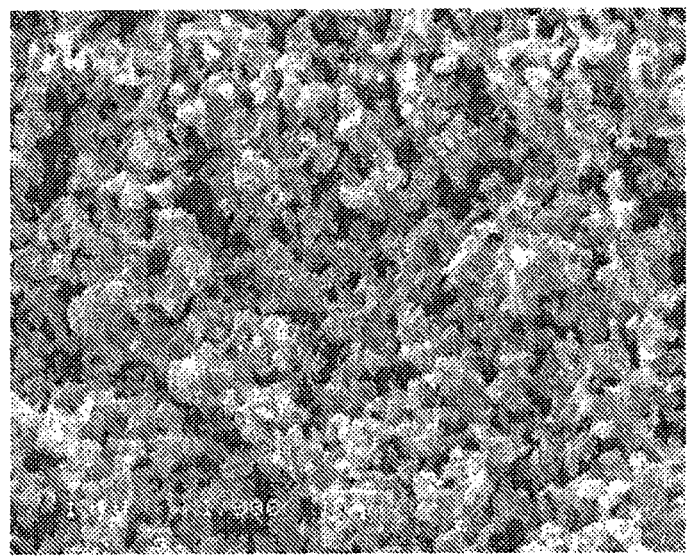
FIG. 8 is a diagram showing a photo of a scanning electron microscope of a surface of an activated carbon of Comparative Example 1 (magnification: 1000 and 4000 times)
Figure 8:
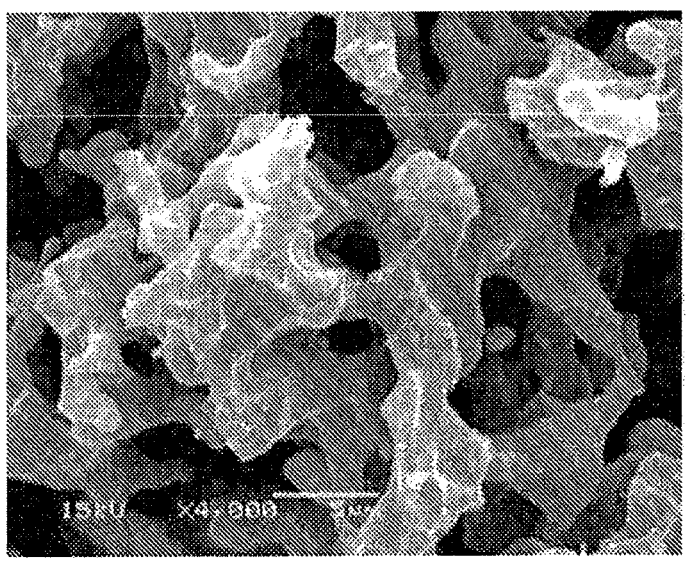
Figure 9:
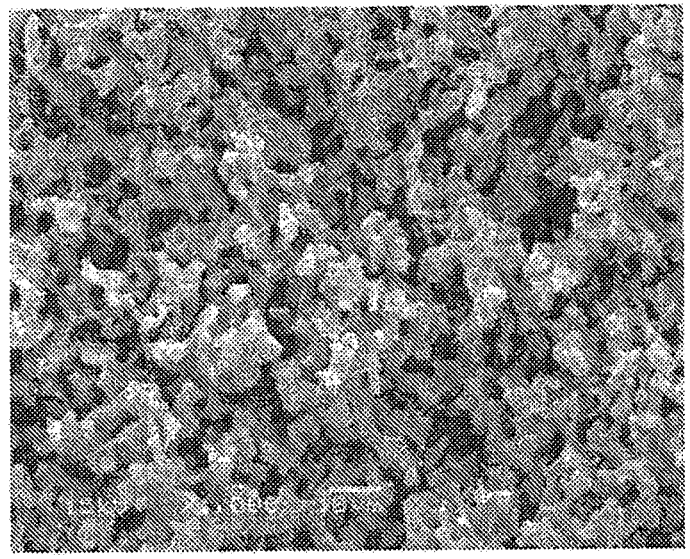
FIG. 9 is a diagram showing a photo of a scanning electron microscope of a surface of an activated carbon of Comparative Example 2 (magnification: 1000 and 4000 times)
Figure 9:
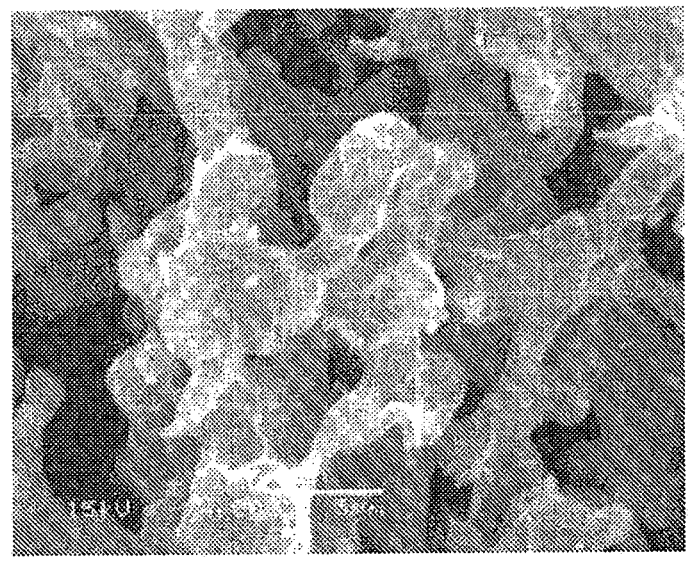
Figure 10:
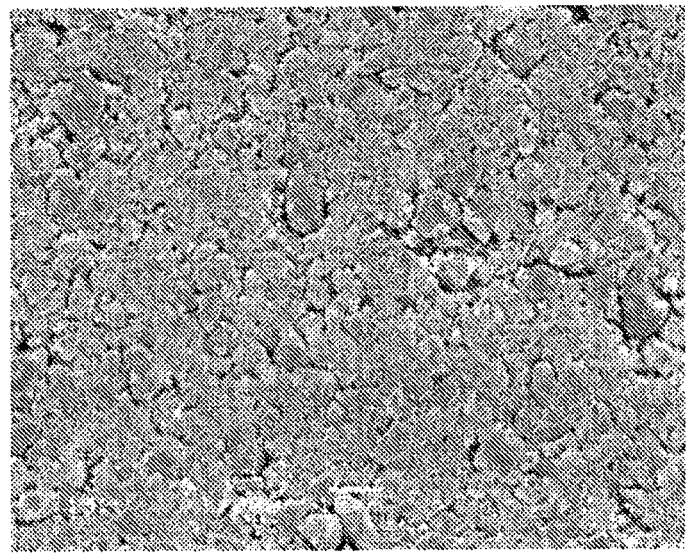
FIG. 10 is a diagram showing a photo of a scanning electron microscope of a surface of an activated carbon of Comparative Example 3 (magnification: 1000 and 4000 times)
Figure 10:
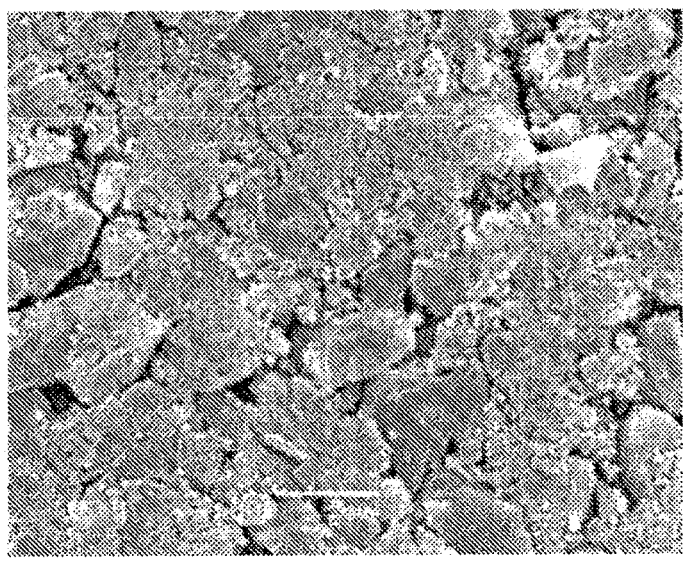

A process of immersing and pressing will be described with reference to FIG. 2. The size of a block of a porous phenolic resin is not specifically limited, but the block is cut out in the size of 25 mm×25 mm or 25 mmϕ, e.g. with a drill press. If the thickness of a cut-out block is adjusted, the block is further cut out in the range of 0.4 to 3 mm thick with a diamond saw. The porous phenolic resin, which is prepared by a block-shaped mold, is cut out in a plate-shaped body 10. According to the use of an activated carbon electrode, the plate shape and size can be changed as well. For example, a porous phenolic resin can be prepared by a cuboid or cylindrical mold, and cut out in the form of a plate or cylinder. The cut-out plate-shaped body 10 is impregnated with an organic solvent 21. Illustrative example of the organic solvent 21 includes ketone and alcohol. In addition, any solvent can be used as long as it can swell and soften a porous phenolic resin. This is required for reducing the bulk of the porous phenolic resin to be crushed with no cracks during pressing and for reducing the entire bulk of the porous phenolic resin so that consecutive macropores thereof show no crushing. Illustrative example of the ketone includes acetone, and illustrative example of the alcohol includes ethanol and isopropanol to swell a porous phenolic resin. A plate-shaped body 10 of a cut-out porous phenolic resin is immersed with an organic solvent 21 for 1 to 10 minutes. The plate-shaped body 10 softens swollen consecutive macropores, and by immersing the same with ketone for 1 to 5 minutes and alcohol for 1 to 10 minutes, respectively as an organic solvent 21, no cracking or crushing is found during pressing to reduce the bulk of the plate-shaped body 10. During pressing, the temperature of a flat press machine 22 is controlled according to the boiling point of a solvent. In the above temperature range, a solvent in consecutive macropores of the porous phenolic resin is evaporated and the swollen porous phenolic resin is dried. The pressing process assuredly causes no shape loss or crack, evaporates a solvent, and dries and cures a porous phenolic resin by adjusting the pressing time accordingly. In order to keep macropores at a higher density, a porous phenolic resin is softened with a solvent and dried with it pressurized. The porous phenolic resin, both in ketone and alcohol, is pressurized in the range of 1.8 to 2.2 ton. With a pressure of under 1.8 ton, the bulk of the porous phenolic resin is not sufficiently reduced. Depending on the thickness of the porous phenolic resin (if it is thin), it is deaerated accordingly by pressurizing or ultrasonic wave when it is immersed.

(c) Process of Cutting Out a Block

The porous phenolic resin immersed and pressed is cut out in the form of a disk having a diameter in the range of 21 to 22 mm according to the use. It is to be noted that a square shape is enough for the cutting out in addition to a disk shape. The shape, size and thickness of a porous phenolic resin are determined according to the use of an activated carbon electrode.

The average pore diameter of consecutive macropores formed in a three-dimensional network pattern is in the range of 3 to 35 μm, because a carbon electrode is not sufficiently activated with a diameter of under a lower limit and, and the mechanical strength declines with a diameter of over an upper limit. The method for measuring the above average pore diameter employs mercury porosimeter.

(d) Process of Carbonizing

Subsequently, the disk 12 composed of a cut-out porous phenolic resin is placed in a heat-treating furnace. The heat-treating furnace used is a horizontal tubular electric furnace. Next, the heat-treating furnace whose inner portion is made to be in inert gas atmosphere is heated from room temperature to a temperature in the range of 700 to 1000° C., preferably heated to a temperature in the range of 800 to 900° C. with a rate of temperature rise of 5 to 20° C./min, and is kept at the temperature for 0.5 to 2 hours in inert gas atmosphere to be subjected to heat treatment. After the heat treatment, the electric furnace is slowly cooled to room temperature. With the above heat treatment conditions, the disk 12 is carbonized to obtain a plate-shaped carbonized product. Illustrative example of the inert gas includes nitrogen, argon, and helium. The heating temperature for carbonizing the disk is set in the above range, because the disk is insufficiently carbonized with a heating temperature of under a lower limit, and it is hard to smoothly perform the next process of activating with a heating temperature of over an upper limit. In addition, the rate of temperature rise for carbonizing the disk is set in the above range, because the disk requires carbonization for too many hours with a heating temperature of under a lower limit, and the disk is insufficiently carbonized with a heating temperature of over an upper limit.

(e) Process of Activating

Further, with the above plate-shaped carbonized product placed in the heat-treating furnace, the heat-treating furnace is heated from room temperature to a temperature in the range of 800 to 900° C. in inert gas atmosphere. Subsequently, no more inert gas is introduced, and carbon dioxide gas is introduced instead. Next, the heat-treating furnace is kept at the increased temperature for 2 to 12 hours, preferably for 8 to 10 hours under carbon dioxide gas circulation so that the activation yield is in the range of 40 to 70%, preferably 50 to 65%.

Herein, the activation yield is defined as a rate of change in sample mass by activation in the following expression.

$$\text{Activation yield (\%)} = (\text{Sample mass after activating}/\text{Sample mass before activating}) \times 100\%$$

The heating temperature for activating the carbonized product is set in the above range, because the disk is not sufficiently activated with a heating temperature of under a lower limit, and the yield extremely declines with a heating temperature of over an upper limit. The activation yield is set in the above range, because the disk is overactivated with a heating temperature of under a lower limit, thereby failing to maintain a plate shape and providing too low productivity, and an activated carbon having a sufficient specific surface area cannot be obtained with a heating temperature of over an upper limit, resulting in poor initial capacitance and durability. The disk is activated in carbon dioxide gas atmosphere due to favorable micropore growth. Illustrative example of the activation gas includes carbon dioxide gas and water vapor.

In addition to the above gas activation method, chemical activation method can be used to activate carbon in the present invention. The chemical activation method is to mix a carbonized product with a chemical such as potassium hydroxide and heat the same.

(f) Characteristics and Use of an Activated Carbon for Use in an Electrode

The activated carbon for use in an electrode of a power-storage device obtained by the gas activation method of the present invention has uniform consecutive macropores, the size of the macropores distributed is centered in the range of 0.01 to 5 μm, the specific surface area is in the range of 1500 to 2700 $m^2/g$, the micropore volume is in the range of 0.55 to 1.0 ml/g, the average micropore width is in the range of 0.79 to 0.95 nm, and the bulk density is in the range of 0.49 to 1.0 gcm$^{-3}$. Preferably, the specific surface area is in the range of 1600 to 2000 m$^2$/g, the micropore volume is in the range of 0.6 to 0.75 ml/g, the average micropore width is in the range of 0.8 to 0.9 nm, and the bulk density is in the range of 0.55 to 0.60 gcm$^{-3}$.

The uniform consecutive macropores are defined herein, because an electrode must sufficiently be impregnated therethrough with an electrolyte with a minimum number of macropores.

The size of the macropores distributed is centered in the above range, because an electrode is insufficiently impregnated with an electrolyte with a size of under a lower limit, and the electrode bulk density unfavorably declines with a size of over an upper limit. The specific surface area of an activated carbon for use in an electrode is set in the above range, because the capacitance is not sufficiently provided with a specific surface area of under a lower limit, and the electrode bulk density unfavorably declines with a specific surface area of over an upper limit. The micropore volume is set in the above range, because the capacitance is not sufficiently provided with a micropore volume of under a lower limit, and the electrode bulk density unfavorably declines with a micropore volume of over an upper limit. The average micropore width is set in the above range, because electrolyte ions fail to adsorb in micropores with a width of under a lower limit, and the electrode bulk density unfavorably declines with a width of over an upper limit. The bulk density is set in the above range, because the volumetric capacitance is low with a density of under a lower limit, and the capacitance at a high current density is low with a density of over an upper limit. The activated carbon for use in an electrode of a power-storage device obtained by the present invention is preferably used for an electric double layer capacitor or a lithium ion capacitor. The present invention enables to produce an activated carbon for use in an electrode of a power-storage device not only having a high volumetric capacitance during charging and discharging at a high current density (2000 mA/g), but also suitable for an electric double layer capacitor excellent in durability to high-voltage (3V or more) charge and a lithium ion capacitor excellent in durability to high-voltage (4V or more) charge.

EXAMPLE

Next, Examples and Comparative Examples of the present invention will be described in details.

Example 1

First, a phenolic resin and PVA are mixed so that the solid ratio is 4/1 and the total mass of the solid content is 30 w/v % of a predetermined amount to prepare an aqueous solution. Subsequently, a 12 w/v % rice starch was added to the aqueous solution and sufficiently mixed to prepare a mixture, and then a 37% formaldehyde aqueous solution (5 w/v %) was added to the mixture as a cross-linking agent and mixed. After maleic acid (7 w/v %) was added to the mixture as a curing catalyst, a predetermined amount of water was added thereto and uniformly mixed to obtain a reaction liquid. The reaction liquid obtained was cast in a mold and reacted at 60° C. for 20 hours. A reaction product obtained was taken out from the mold and cleaned with water to remove a starch, and dried. According to the method, a block of a porous phenolic resin as a carbon precursor, including consecutive macropores having an average pore diameter of 7 μm with a porosity of 75% and formed in a three-dimensional network pattern, is obtained. The block of the porous phenolic resin was cut out with a diamond saw to obtain a plate body (25 mm×25 mm×1 mm). The plate body was immersed with a 99% acetone solution for 2 minutes and taken out, and thereafter inserted and pressed in a flat press machine with a controlled temperature of 60° C. The plate body was pressurized (a load of 2 ton) and depressurized with 4 cycles. The 5$^{th}$-cycle and last pressurizing was performed for 10 seconds. In Example 1, the porous phenolic resin was softened with an acetone as a solvent, kept pressurized and sufficiently dried, and repeatedly pressurized and depressurized to obtain flatness. For example, one long pressurizing, adding up the above pressurizing time, allows drying and flatness. The porous phenolic resin immersed and pressed was cut out in a plate body to obtain a disk with a 22 mm diameter and 0.4 mm thickness. The disk was heated with a rate of temperature rise of 5° C./min from room temperature to 800° C. in nitrogen atmosphere and was kept in nitrogen atmosphere for 1 hour to prepare a carbonized product (hereinafter referred to as MLC). Next, after the carbonized product was heated with a rate of temperature rise of 10° C./min from room temperature to 850° C. in nitrogen atmosphere, the introducing gas was changed to carbon dioxide gas, and the carbon dioxide gas was circulated to keep and activate the same at 850° C. for 6 hours and a disk-shaped activated carbon with a 16 mm diameter and approximately 0.3 mm thickness was obtained.

Example 2

The conditions were the same as Example 1 other than activation of a carbonized product by keeping the same for 8 hours to obtain a disk-shaped activated carbon with a 16 mm diameter and 0.3 mm thickness.

Example 3

First, a phenolic resin and PVA are mixed so that the solid ratio is 3/1 and the total mass of the solid content is 20 w/v, of a predetermined amount to prepare an aqueous solution. Subsequently, a 9 w/v % rice starch was added to the aqueous solution and sufficiently mixed, and then a 37% formaldehyde aqueous solution (5 w/v %) was added as a cross-linking agent and mixed. After maleic acid (6 w/v %) was added as a curing catalyst, a predetermined amount of water was added thereto and uniformly mixed to obtain a reaction liquid. The reaction liquid obtained was cast in a mold and reacted at 60° C. for 20 hours. A reaction product obtained was taken out from the mold, cleaned with water to remove a starch, and dried. According to the method, a disk of a porous phenolic resin, including consecutive macropores having an average pore diameter of 9 μm, is obtained. Other conditions were the same as Example 1 to obtain a disk-shaped activated carbon with a 16 mm diameter and approximately 0.3 mm thickness.

Example 4

The conditions were the same as Example 3 other than activation of a carbonized product by keeping the same for 8 hours to obtain a disk-shaped activated carbon with a 16 mm diameter and 0.3 mm thickness.

Example 5

The conditions are the same as Example 1 other than activation of a carbonized product by keeping the same for 10 hours to obtain a disk-shaped activated carbon with a 16 mm diameter and 0.3 mm thickness.

Comparative Example 1

A block of a porous phenolic resin as a carbon precursor, including consecutive macropores having an average pore diameter of 7 μm with a porosity of 75% and formed in a three-dimensional network pattern obtained by the same method as Example 1, was cut out with a diamond saw to obtain a disk with a 22 mm diameter and 1 mm thickness. The disk was not pressed, and it was heated with a rate of temperature rise of 5° C./min from room temperature to 800° C. in nitrogen atmosphere, and kept in nitrogen atmosphere for 1 hour to prepare a carbonized product (hereinafter referred to as MLC). Next, after the carbonized product was heated with a rate of temperature rise of 10° C./min from room temperature to 850° C. in nitrogen atmosphere, the introduced gas was changed to carbon dioxide gas, carbon dioxide gas was circulated, and the carbonized product was kept and activated at 850° C. for 8 hours to obtain a disk-shaped activated carbon with a 16 mm diameter and approximately 0.8 mm thickness.

Comparative Example 2

A disk of a porous phenolic resin having an average pore diameter of consecutive macropores of 9 μm obtained by the same method as Example 3 was not pressed and kept for 10 hours to be activated. Other conditions were the same as Example 1 to obtain a disk-shaped activated carbon with a 16 mm diameter and approximately 0.8 mm thickness.

Comparative Example 3

A coconut shell activated carbon water vapor activated carbon (Product from Kuraray Chemical Co., Lrd.: YP50F) as a activated carbon powder, acetylene black as a conductive auxiliary agent, and a polytetrafluoroethylene (PTFE) caking additive as a binder were prepared. The acetylene black and the PTFE caking additive were added to YP50F (30 mg) and mixed. The mixing ratios of the carbon material, the acetylene black and the PTFE caking additive were 85% by mass, 10% by mass, and 5% by mass, respectively. A mixture thereof was pressurized with a pressing machine at approx. 6 MPa for 20 minutes using an IR tablet molding machine, and molded into a disk-shape with a 13 mm diameter and approximately 0.5 mm thickness to obtain a disk-shaped activated carbon. YP50F is widely used as an activated carbon for use in an electrode of an electric double layer capacitor.

Comparative Test 1 and Evaluation

The physical properties of the carbon materials obtained in Examples 1 to 5 and Comparative Examples 1 to 3 were examined. The results are shown in the following Table 1.

BET Specific Surface Area, Mesopore Volume, Micropore Volume and Average Micropore Width Using carbon materials obtained in Examples 1 to 5 and Comparative Examples 1 to 3, the physical properties were measured at 77K by nitrogen adsorption-desorption method. The BET specific surface area was determined from an adsorption isotherm obtained, the mesopore volume was measured using DH method, and the micropore volume and average micropore width were measured using DR method.

A micropore refers to a pore of under 2 nm, and a mesopore refers to a pore in the range of 2 to 50 nm.

Electron Microscope

Carbon materials obtained in Examples 1 to 5 and carbon materials obtained in Comparative Examples 1 to 3 were observed by scanning electron microscope (SEM) to obtain SEM images. FIGS. 3 to 10 show SEM images of carbon materials obtained in Examples 1 to 5 and Comparative Examples 1 to 3. FIGS. 3(a) to 10(a) show the images magnified 1000 times, and FIGS. 3(b) to 10(b) show the images magnified 4000 times. The carbon materials in Examples 1 to 5 and Comparative Examples 1 and 2 are not composed of a group of separate activated carbon particles unlike a conventional molded type of activated carbon for use in an electrode of Comparative Example 3. Therefore, there is no contact interface between particles. Also, compared to Comparative Examples 1 and 2, there seems smaller consecutive pores between porous phenolic resins in Examples 1 to 5. This suggests that in Examples 1 to 5, pressing causes a smaller interval between porous phenolic resins.

Mercury Porosimeter

Figure 11:
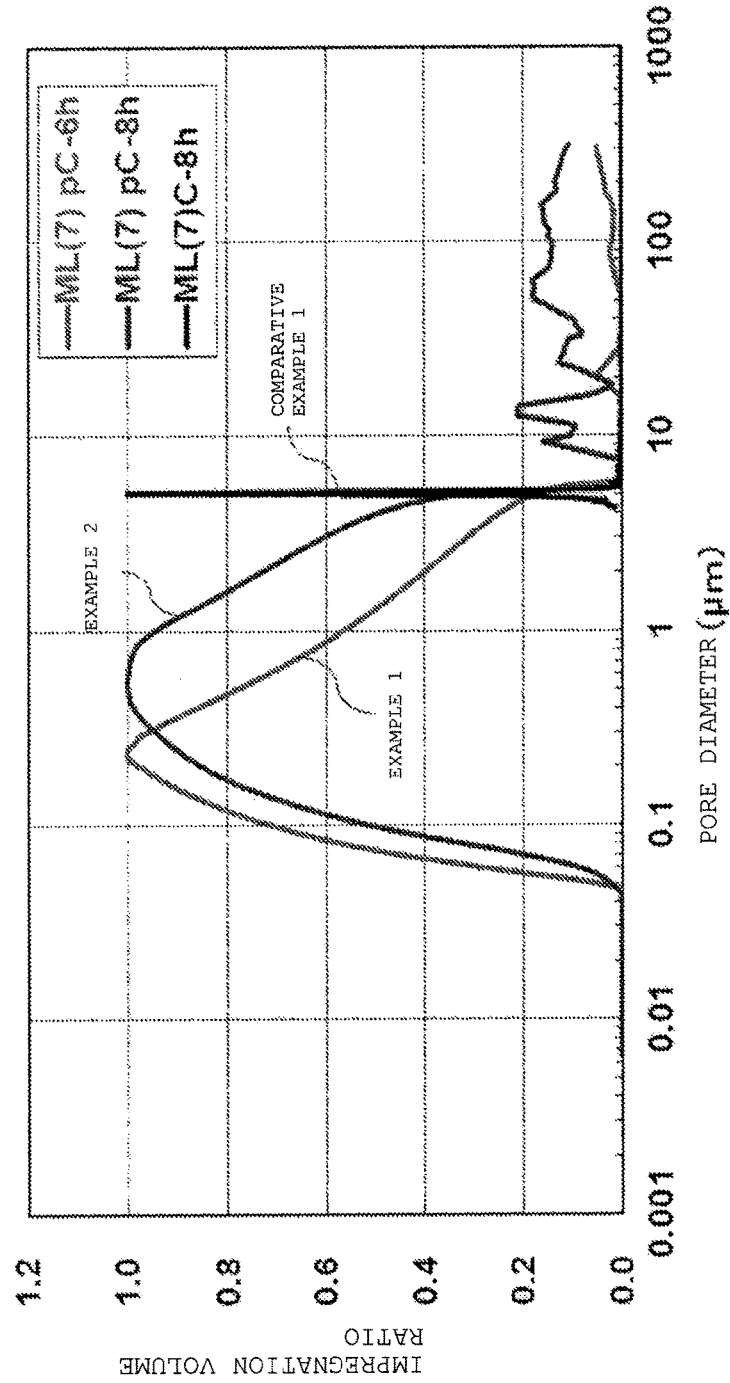
FIG. 11 shows the results of pore diameter distribution of activated carbons of Examples 1 and 2 and Comparative Example 1 using mercury porosimeter.
Figure 12:
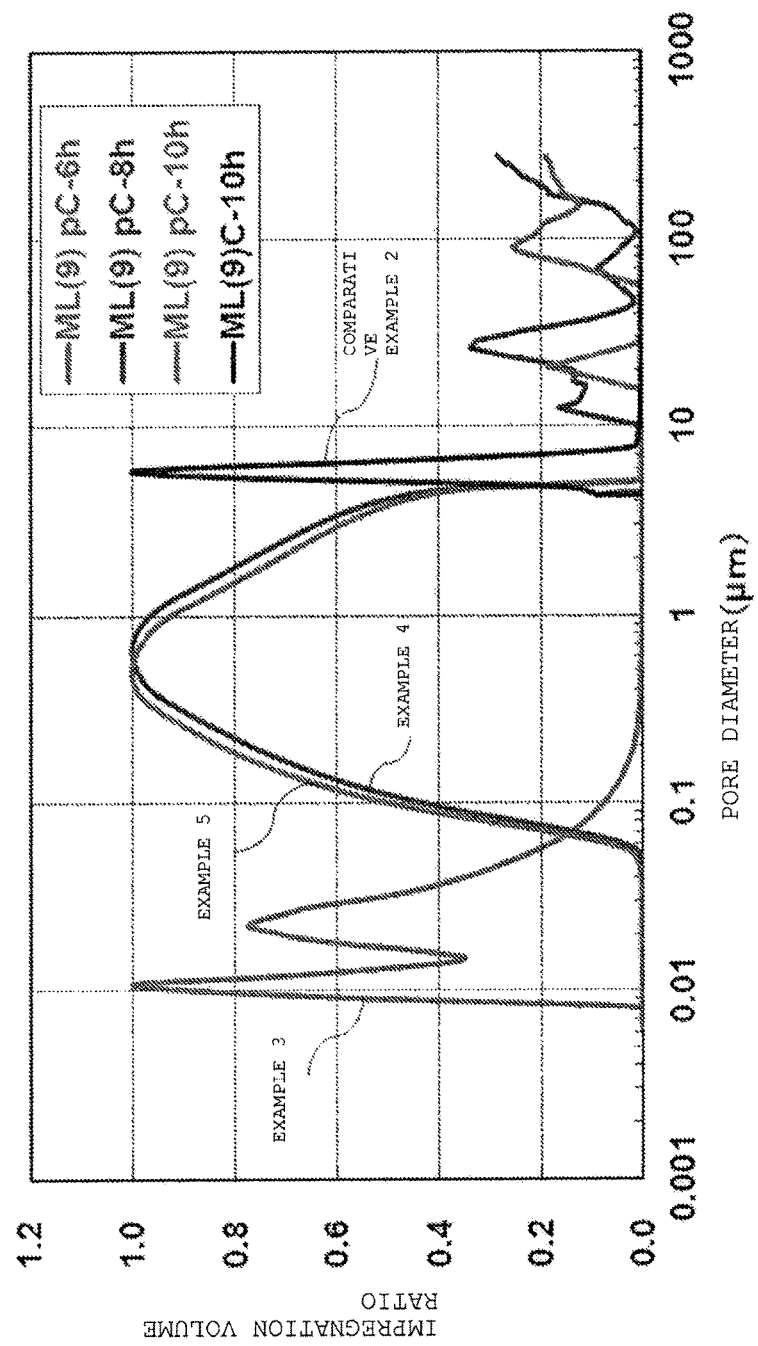
FIG. 12 shows the results of pore diameter distribution of activated carbons of Examples 3 to 5 and Comparative Example 2 using mercury porosimeter.
Figure 13:
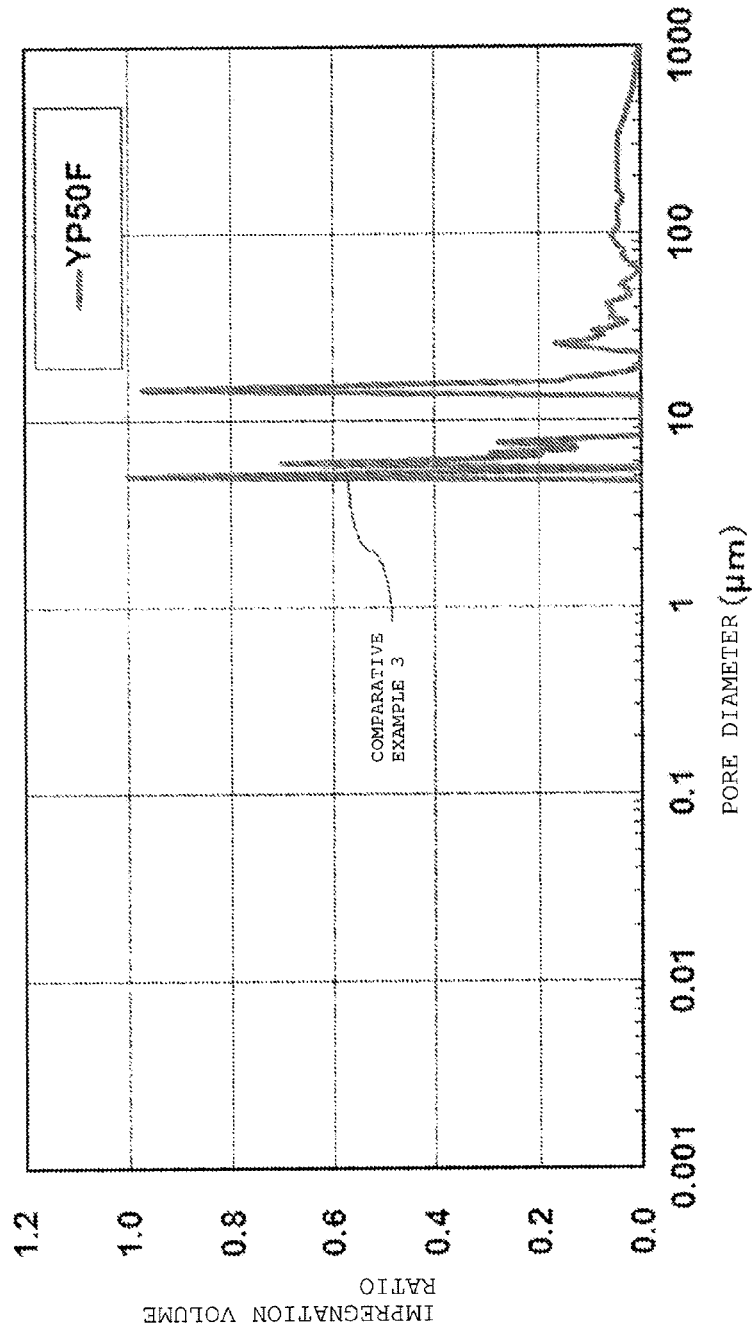
FIG. 13 is shows the results of pore diameter distribution of an activated carbon of Comparative Example 3 using mercury porosimeter.

FIGS. 11 to 13 show the results of pore diameter distribution measurement with a pore diameter in the range of 0.006 to 1000 μm of carbon materials obtained in Examples 1 to 5 and Comparative Examples 1 to 3 using mercury porosimeter. FIGS. 11 and 12 demonstrate uniform distribution of macropores of carbon materials of Examples 1 to 5. The pore diameters were 0.05 to 5 μm in Examples 1, 2, 4, and 5, and the pore diameter was 0.008 to 0.3 μm in Example 3. It is supposed that the results of pore diameter distribution measurement roughly corresponds to SEM images in FIGS. 3 to 10. FIG. 13 shows that a conventional type of electrode of Comparative Example 3 has a plurality of distribution peaks that are non-uniform. FIGS. 11 and 12 show that the pore diameter of macropores by carbonizing and activating is reduced to approx. 0.2 μm in Example 1 with an average pore diameter of 7 μm, and to approx. 0.02 μm in Example 3 with an average pore diameter of 9 μm.

Table 1 shows preparation conditions and sample names of Examples 1 to 5 and Comparative Examples 1 to 3.

Table 2, shows the activation yield, electrode bulk density, and pore structure parameters obtained by nitrogen adsorption-desorption measurement method. Pores (mainly micropores) of Examples 1 to 5 grow with increased activation time, and 8-hour activation makes the specific surface area exceed 1500 $m^2/g$. This specific surface area can be no less favorable than that of a molded electrode (coconut shell activated carbon for electric double layer capacitor). By comparing Comparative Examples 1 and 2, which are conventional types of unpressed activated carbons, and Examples 1 to 5, Examples 1 to 5 show a higher activation yield with the identical activation time and less grown micropores. This is probably because Examples 1 to 5 show a smaller pore diameter of consecutive macropores, thereby causing less diffusion of $CO_2$ through the consecutive macropores. In addition, the electrode bulk density of high-density products of Examples 1 to 5 is about twice as those of conventional products, so a higher volumetric capacitance is likely to be provided.

TABLE 1

| | Sample name | Microlight average macropore diameter [μm] | Higher density treatment | $CO_2$ activation time [h] |
|---|---|---|---|---|
| Example 1 | ML (7) pC-6h | 7 | Treated | 6 |
| Example 2 | ML (7) pC-8h | 7 | Treated | 8 |
| Example 3 | ML (9) pC-6h | 9 | Treated | 6 |
| Example 4 | ML (9) pC-8h | 9 | Treated | 8 |
| Example 5 | ML (9) pC-10h | 9 | Treated | 10 |
| Comparative Example 1 | ML (7) C-8h | 7 | None | 8 |
| Comparative Example 2 | ML (9) C-10h | 9 | None | 10 |
| Comparative Example 3 | YP50F | — | — | — |

TABLE 2

| | | Activation yield [%] | Electrode bulk density [gcm$^{-3}$] | BET specific surface area [m$^2$g$^{-1}$] | Mesopore volume [mlg$^{-1}$] | Micropore volume [mlg$^{-1}$] | Average micropore width [nm] |
|---|---|---|---|---|---|---|---|
| Example 1 | ML (7) pC-6h | 66 | 0.55 | 1500 | 0.10 | 0.59 | 0.81 |
| Example 2 | ML (7) pC-8h | 59 | 0.58 | 1710 | 0.11 | 0.67 | 0.87 |
| Example 3 | ML (9) pC-6h | 68 | 0.58 | 1390 | 0.09 | 0.55 | 0.79 |
| Example 4 | ML (9) pC-8h | 64 | 0.59 | 1530 | 0.11 | 0.61 | 0.85 |
| Example 5 | ML (9) pC-10h | 53 | 0.49 | 1930 | 0.15 | 0.74 | 0.93 |
| Comparative Example 1 | ML (7) C-8 h | 51 | 0.22 | 2280 | 0.18 | 0.93 | 1.08 |
| Comparative Example 2 | ML (9) C-10h | 51 | 0.24 | 2160 | 0.17 | 0.89 | 1.06 |
| Comparative Example 3 | YP50F * | — | 0.60 | 1590 | 0.22 | 0.58 | 0.89 |

Note:
YP50F's specific surface area, pore volume, and pore width are determined not by measuring molded electrode, but by YP50F's powder.

Comparative Test 2 and Evaluation (Preparation of an Electrode for an Electric Double Layer Capacitor)

An aluminum foil was prepared as a current collector, and a conductive adhesive coating was applied to the aluminum foil to laminate and bond disk-shaped activated carbons obtained in Examples 1 to 5 and Comparative Examples 1 to 3, and integrate the activated carbons and the collector. Accordingly, each electrode was prepared.

Specifically, HITASOL (Product from Hitachi Chemical Co., Ltd., conductive adhesive coating for EDLC) was applied to an etched aluminum foil (Product from Japan Capacitor Industrial Co., Ltd., collector for EDLC), and disk-shaped activated carbons obtained in Examples 1 to 5 and Comparative Examples 1 to 3 were laminated thereon to prepare each electrode.

(Preparation of a Two-Electrode Cell for an Electric Double Layer Capacitor)

Figure 16:
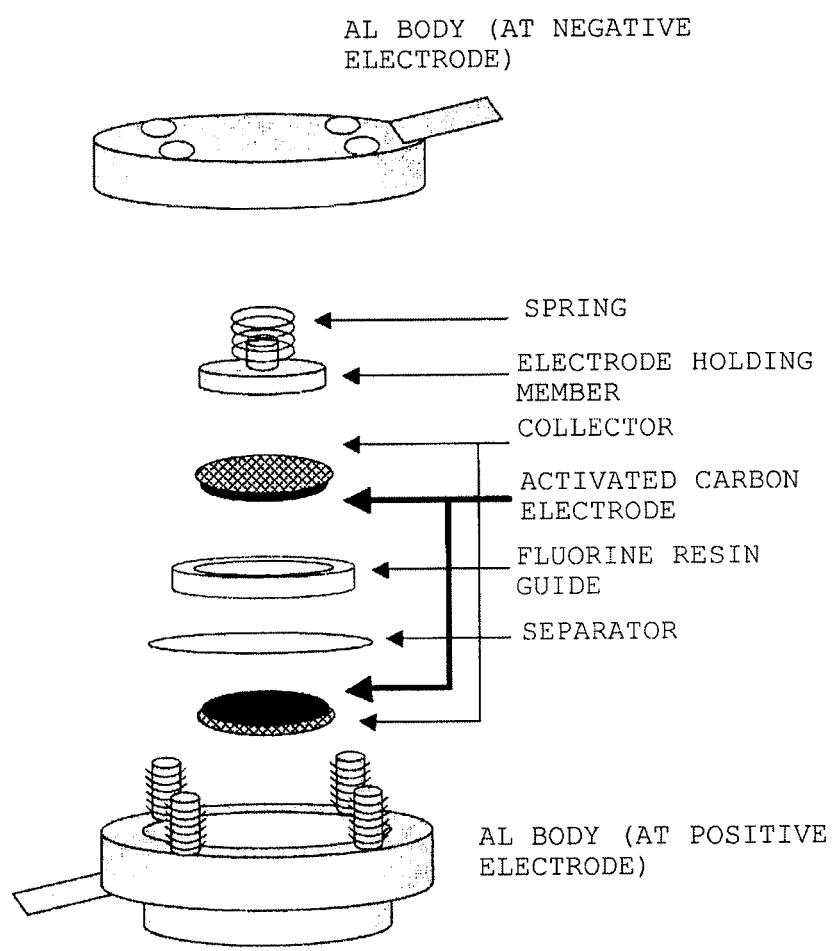
FIG. 16 is a diagram showing the structure of a two-electrode cell for evaluating electric double layer capacitors used in Examples and Comparative Examples.

In order to measure the capacitance of an electric double layer capacitor and perform a durability test, each aluminum two-electrode cell having a structure shown in FIG. 16 was prepared and used, using activated carbon electrodes obtained in Examples 1 to 5 and Comparative Examples 1 to 3. The two-electrode cell was prepared by placing in series a positive electrode, a separator, a fluorocarbon resin guide and a negative electrode on an aluminum body at the positive electrode having electric wiring, impregnating both electrodes with an electrolyte and further placing an electrode holding member having a spring and an aluminum body at the negative electrode having electric wiring on an integrated collector at the negative electrode to sandwich the same between the aluminum body at the positive electrode and the aluminum body at the negative electrode. The electrolyte for an electric double layer capacitor was a propylene carbonate solution containing 1.0M concentration of triethylmethylammonium tetrafluoroborate (($C_2H_5$)$_3$$CH_3NBF_4$) as an electrolyte salt. The electrolyte is commonly used as an organic electrolyte for an electric double layer capacitor.

The activated carbon electrode zone was impregnated with an electrolyte by keeping the activated carbon electrode in the electrolyte for 30 minutes after drying the activated carbon electrode with a thermal vacuum dryer at 200° C. for 2 hours and transferring the same into an argon glove box.

(Evaluation of Current Density Dependence)

Figure 14:
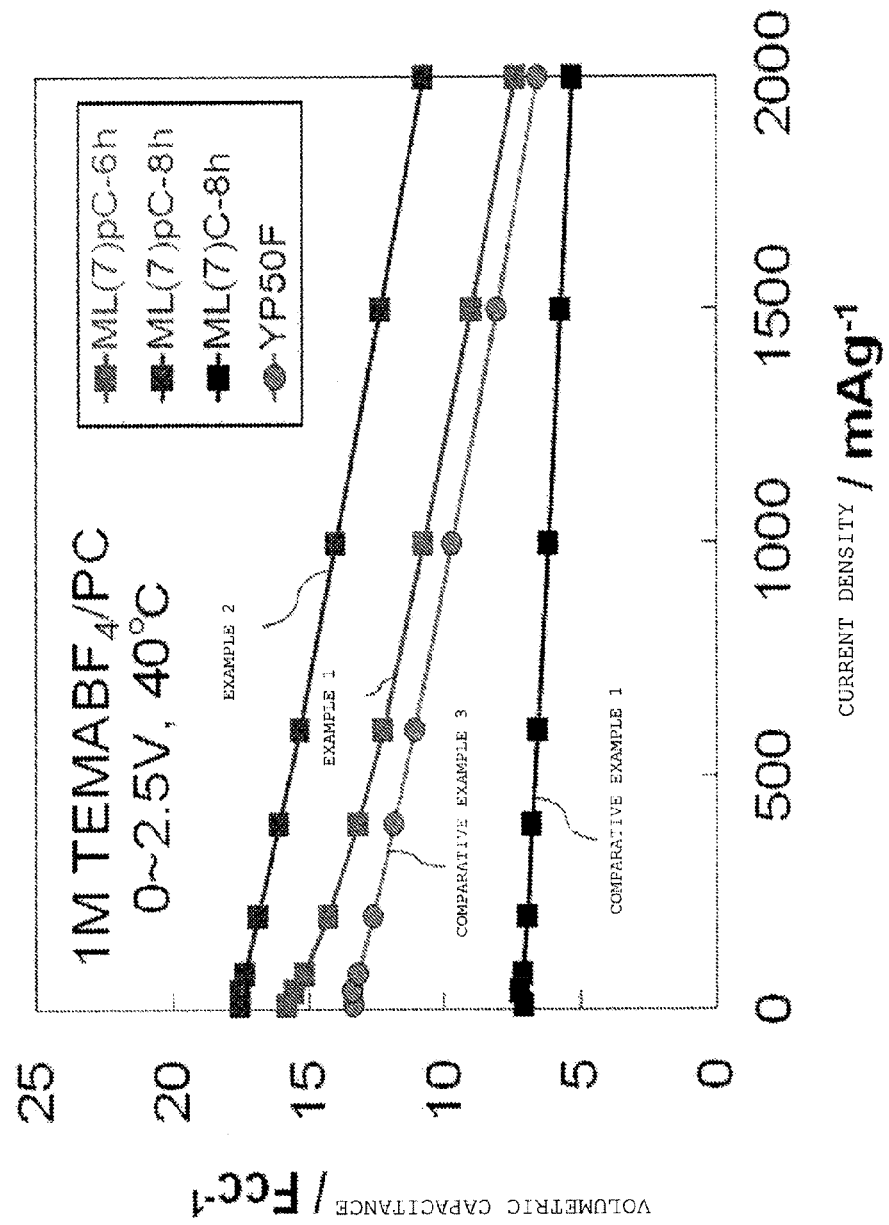
FIG. 14 is a diagram showing current density dependence of capacities per volume of activated carbons of Examples 1 and 2 and Comparative Examples 1 and 3.
Figure 15:
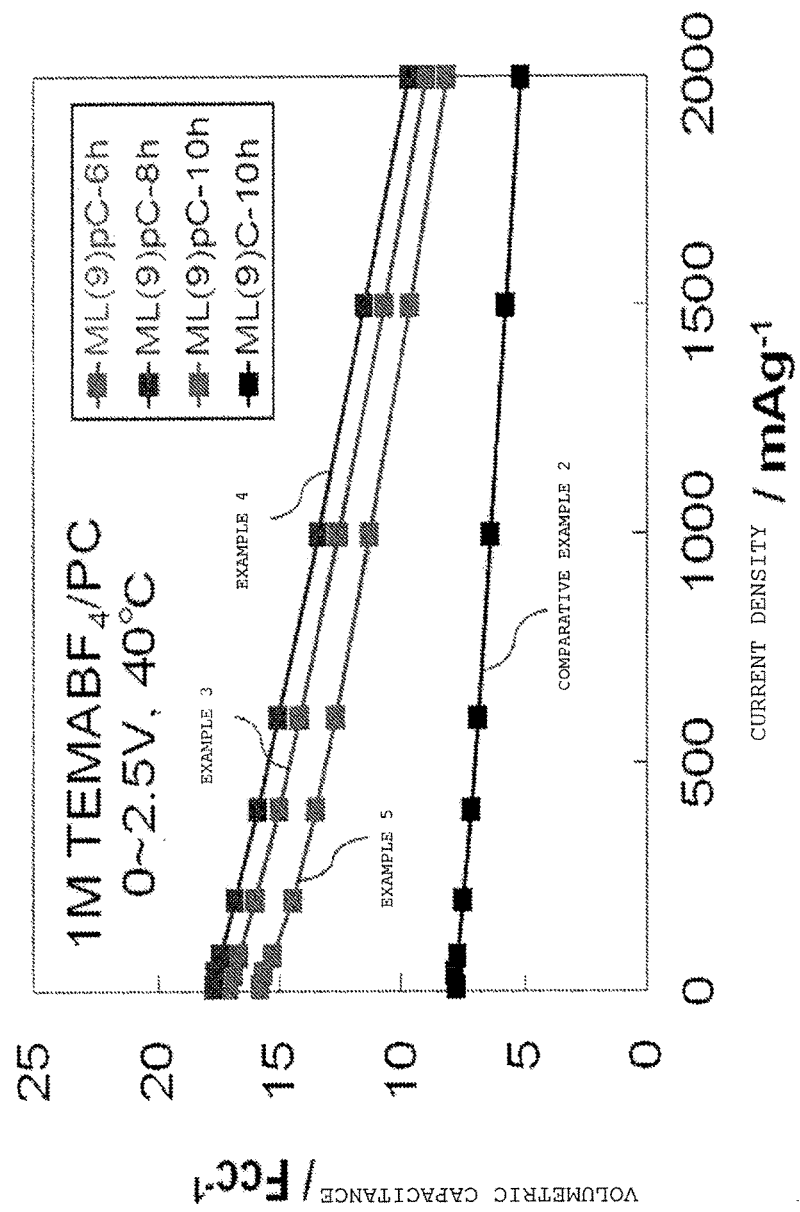
FIG. 15 is a diagram showing current density dependence of capacities per volume of activated carbons of Examples 3 to 5 and Comparative Example 2.

The capacitance for current density dependence evaluation of the volumetric capacitance of an electric double layer capacitor was measured by constant current method, with 5-cycle charge and discharge at fixed current densities of 10 mA/g, 40 mA/g, 80 mA/g, 200 mA/g, 400 mA/g, 600 mA/g, 1000 mA/g, 1500 mA/g, 2000 mA/g and with an evaluation voltage of 0 to 2.5V at 40° C. FIG. 14 shows current density dependence of the volumetric capacitance of an electric double layer capacitor using disk-shaped activated carbons of Examples 1 and 2, and Comparative Examples 1 and 3, and FIG. 15 shows current density dependence of the volumetric capacitance of an electric double layer capacitor using disk-shaped activated carbons of Examples 3 to 5 and Comparative Example 2.

The high-density products of Examples 1 to 5 show a higher volumetric capacitance compared to not only conventional types of products but also a molded electrode of Comparative Example 3, and its advantage is maintained even during charging and discharging at a high current density of 2000 mA/g. The excellent volumetric capacitances of high-density products of Examples 1 to 5 are attributed to high electrode bulk densities. Since the weight of each activated carbon electrode of Examples 1 to 5 and Comparative Examples 1 and 2 is about 30 mg, there is almost no difference in electrode weight compared with a molded electrode used as a comparison, and accordingly the effect of electrode weight is negligible.

(Durability Test)

Figure 17:
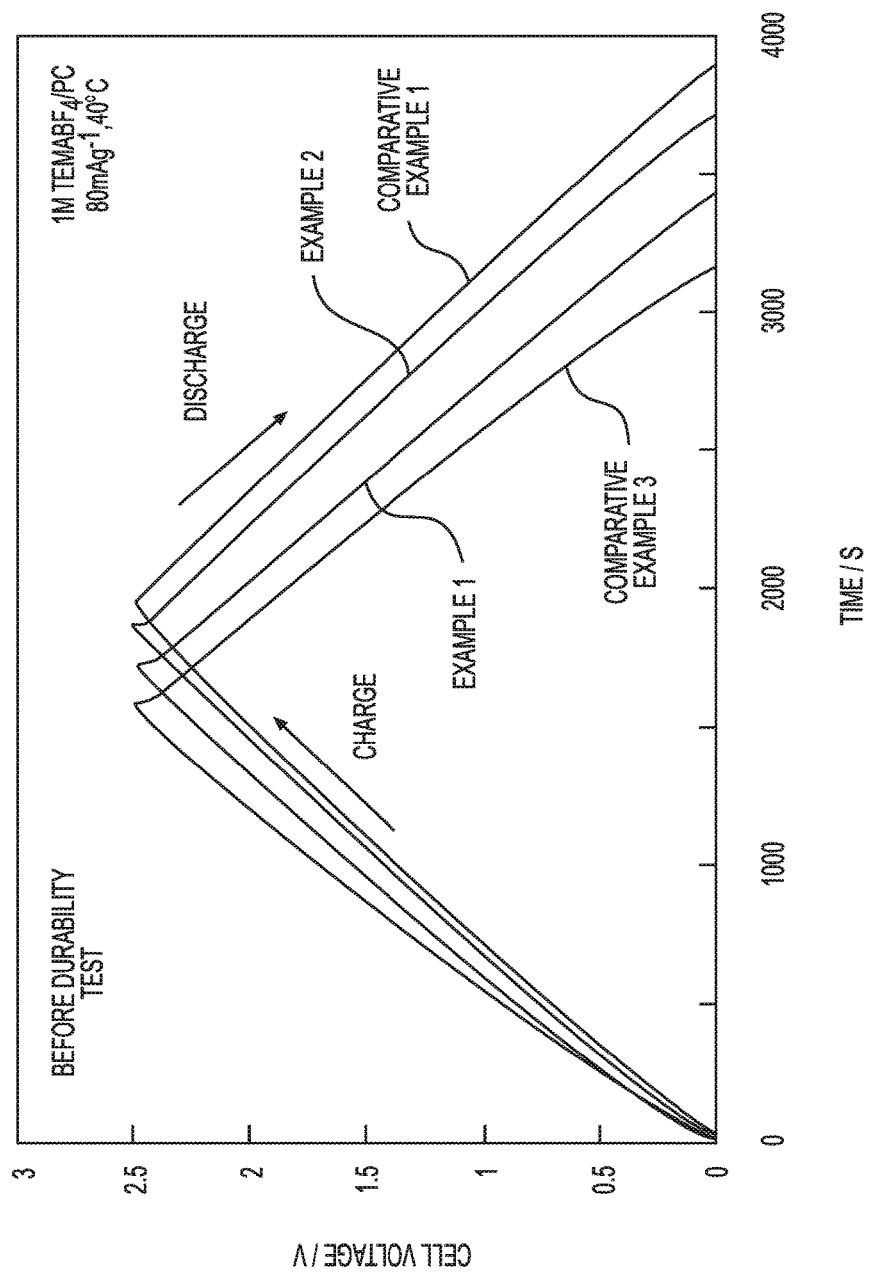
FIG. 17 is a diagram showing charge and discharge curves before durability test of electric double layer capacitors of activated carbons of Examples 1 and 2 and Comparative Examples 1 and 3.
Figure 18:
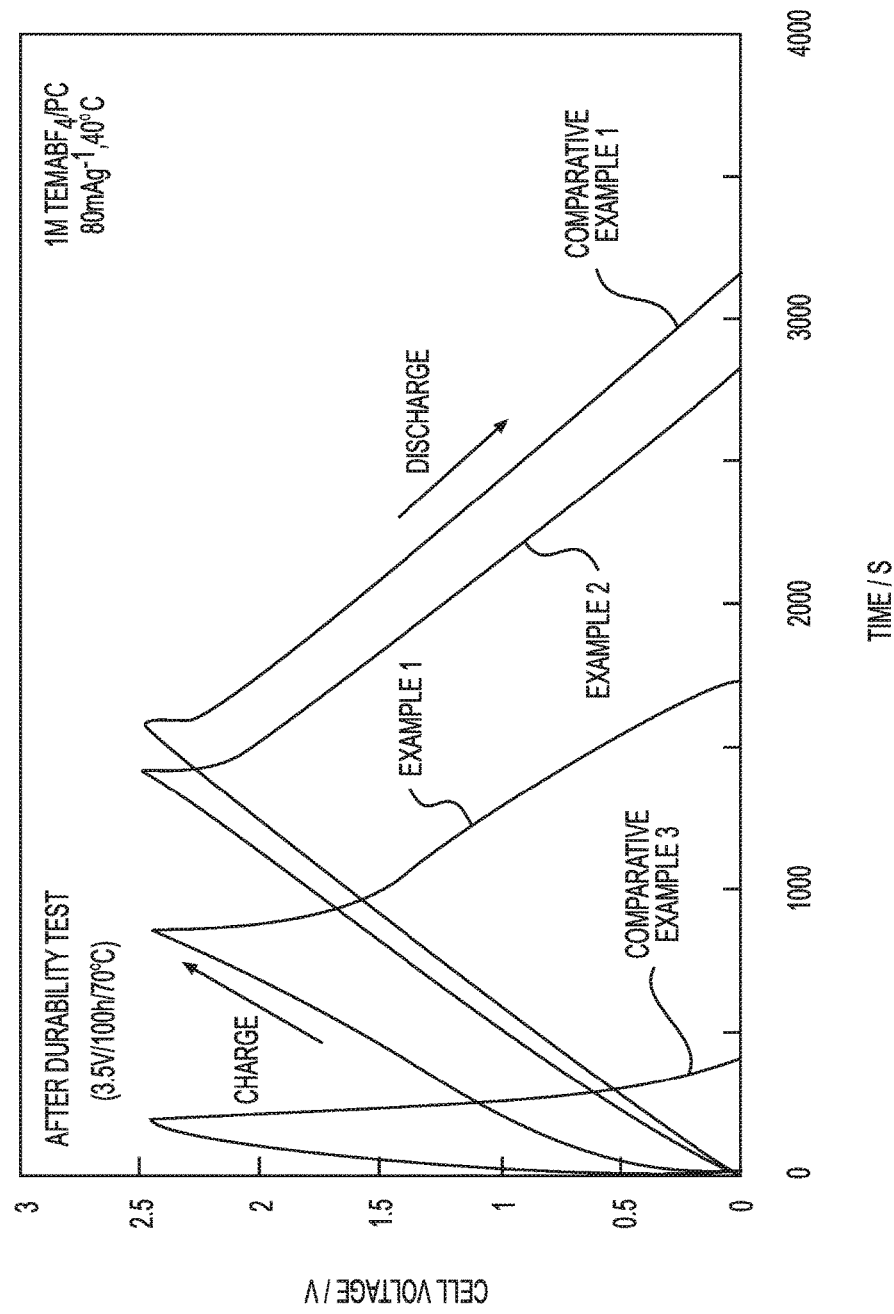
FIG. 18 is a diagram showing charge and discharge curves after durability test of electric double layer capacitors of activated carbons of Examples 1 and 2 and Comparative Examples 1 and 3.
Figure 19:
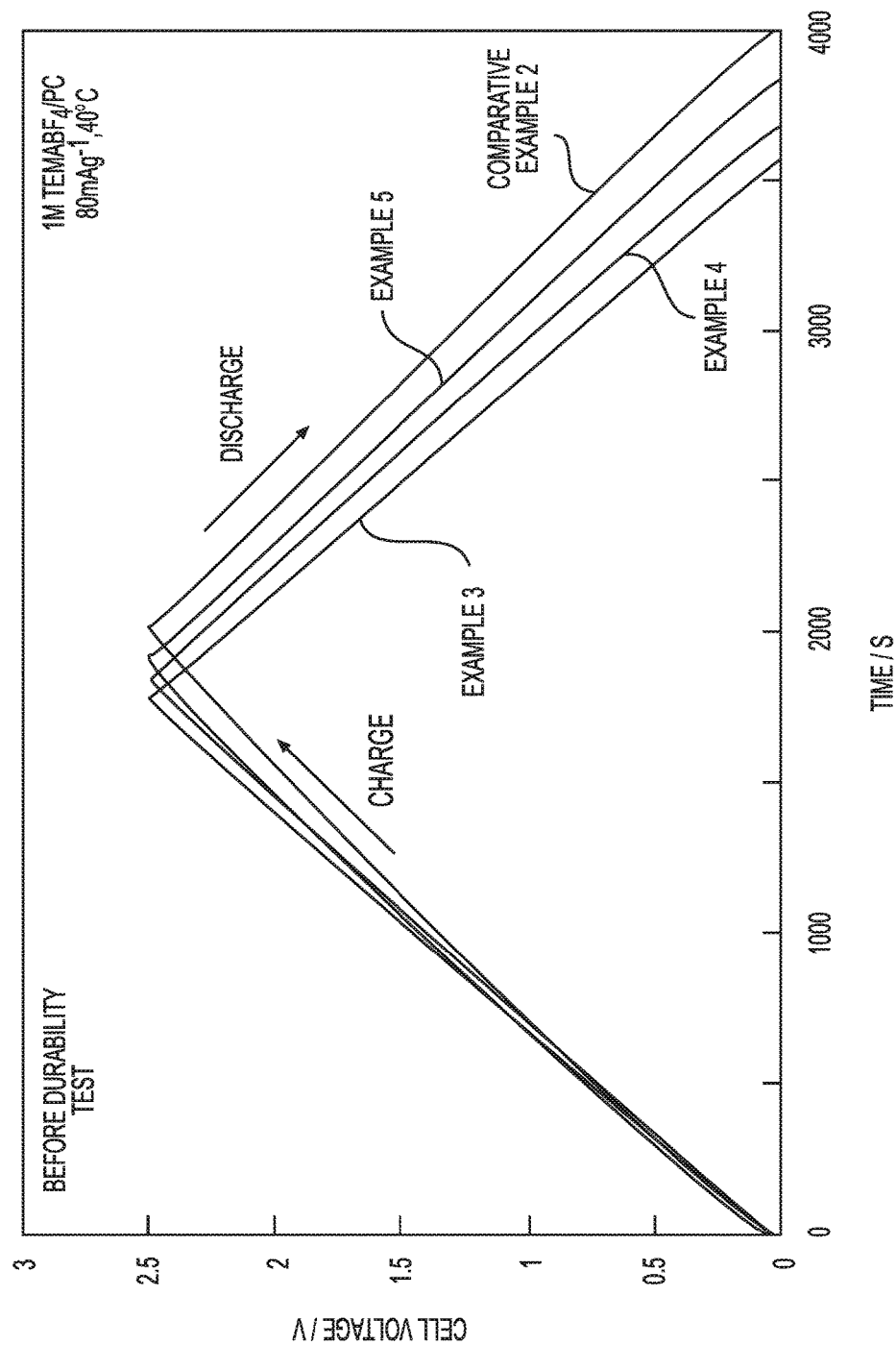
FIG. 19 is a diagram showing charge and discharge curves before durability test of electric double layer capacitors of activated carbons of Examples 3 to 5 and Comparative Example 2.
Figure 20:
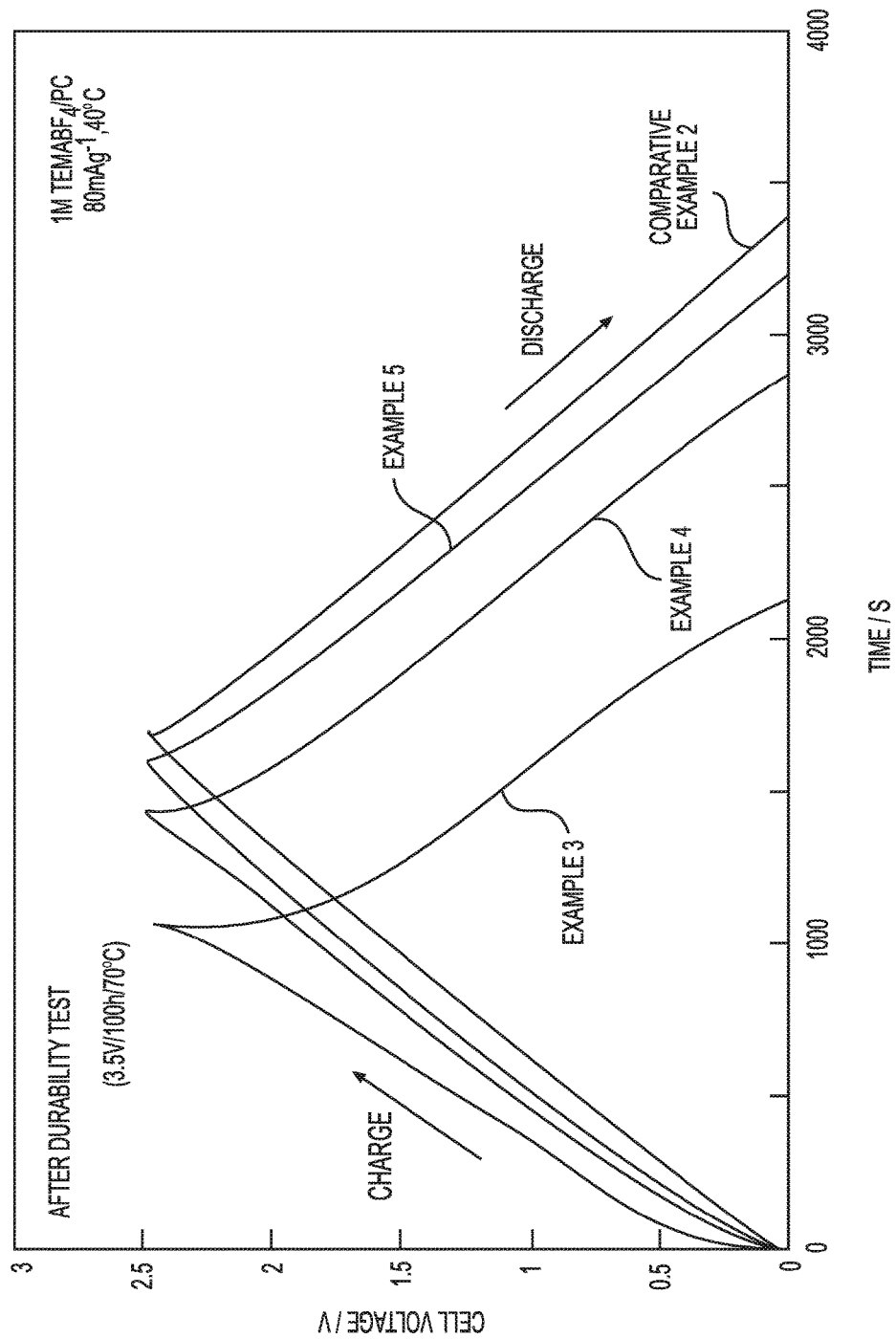
FIG. 20 is a diagram showing charge and discharge curves after durability test of electric double layer capacitors of activated carbons of Examples 3 to 5 and Comparative Example 2.

The capacitance for evaluation of durability of an electric double layer capacitor was measured at 40° C. by constant current method (current density: 80 mA/g, measured voltage range: 0 to 2.5V). First, the $5^{th}$-cycle capacitance was defined as initial capacitance. Next, after the capacitance was measured, 3.5V voltage was applied to a cell at 70° C. for 100 hours to perform a durability test. Subsequently, after the durability test, the temperature was set at 40° C. again to obtain the capacitance by constant current method (current density: 80 mA/g, measured voltage range: 0 to 2.5V). The $5^{th}$-cycle capacitance was defined as terminal capacitance. The ratio of the capacitance after the durability test to the capacitance before the durability test (ratio of terminal capacitance to initial capacitance) was defined as capacitance retention ratio. FIG. 17 shows charge and discharge curves before the durability test of electric double layer capacitors using disk-shaped activated carbons of Examples 1 and 2 and Comparative Examples 1 and 3. FIG. 18 shows charge and discharge curves after the test. FIG. 19 shows charge and discharge curves before the durability test of electric double layer capacitors using disk-shaped activated carbons of Examples 3 to 5 and Comparative Example 2. FIG. 20 shows charge and discharge curves after the test. Table 3 shows the initial volumetric capacitance, volumetric capacitance after the durability test (terminal volumetric capacitance), and capacitance retention ratio. The volumetric capacitance was given by normalizing the capacitance calculated from a charge and discharge curve by the total volume of positive and negative electrodes.

TABLE 3

| | | Initial volumetric capacitance [Fcm$^{-3}$] | Terminal volumetric capacitance [Fcm$^{-3}$] | Capacitance retention ratio [%] |
|---|---|---|---|---|
| Example 1 | ML (7) pC-6h | 15.0 | 7.5 | 50 |
| Example 2 | ML (7) pC-8h | 17.2 | 13.1 | 76 |
| Example 3 | ML (9) pC-6h | 16.6 | 9.9 | 60 |
| Example 4 | ML (9) pC-8h | 17.3 | 13.4 | 77 |
| Example 5 | ML (9) pC-10h | 15.1 | 12.5 | 83 |
| Comparative Example 1 | ML (7) C-8h | 7.0 | 5.6 | 80 |
| Comparative Example 2 | ML (9) C-10h | 7.6 | 6.4 | 84 |
| Comparative Example 3 | YP50F | 13.0 | 1.6 | 12 |

By comparing the data in FIGS. 17 to 20, all the samples show a linear charge and discharge curve typical of a capacitor before the durability test. In Examples 2, 4 and 5, and Comparative Examples 1 and 2, although each line's gradient was slightly steep after the durability test, the charge and discharge curves obtained were almost the same as before the test. However, in Examples 1 and 3, the curves were warped after the durability test. In Comparative Example 3, the curve was significantly warped after the durability test.

Meanwhile, with reference to Table 3, compared to the initial volumetric capacitances of Comparative Examples 1 to 3, the initial volumetric capacitances of Examples 1 to 5 were 1.2 to 2.5 times, and the terminal volumetric capacitances were 1.2 to 8.4 times. In Examples 2, 4 and 5, the capacitance retention ratios were also high at 76 to 83%. Excellent properties of Examples 2, 4 and 5 are attributed to a favorable balanced combination of seamless structure and high electrode bulk density.

Micropores formed on the wall surface of consecutive pores must sufficiently be grown enough to adsorb and desorb electrolyte ions even if the wall surfaces of consecutive pores by the durability test degrade. The shorter the time for activation is, the more insufficiently pores grow. Thus, it will become hard to adsorb and desorb electrolyte ions in micropores by more or less degradation of the wall surfaces of consecutive pores. In Examples 1 and 3, the capacitance retention ratios and terminal capacities are believed to be low due to shorter activation time than Example 5.

Comparative Test 3 and Evaluation (Preparation of an Electrode for a Lithium Ion Capacitor)

Using disk-shaped activated carbons obtained in Example 4 and Comparative Examples 1 and 3, each electrode to be used in a cell for a lithium ion capacitor was prepared, as in comparative test 2.

(Preparation of Cell for Lithium Ion Capacitor)

Figure 21:
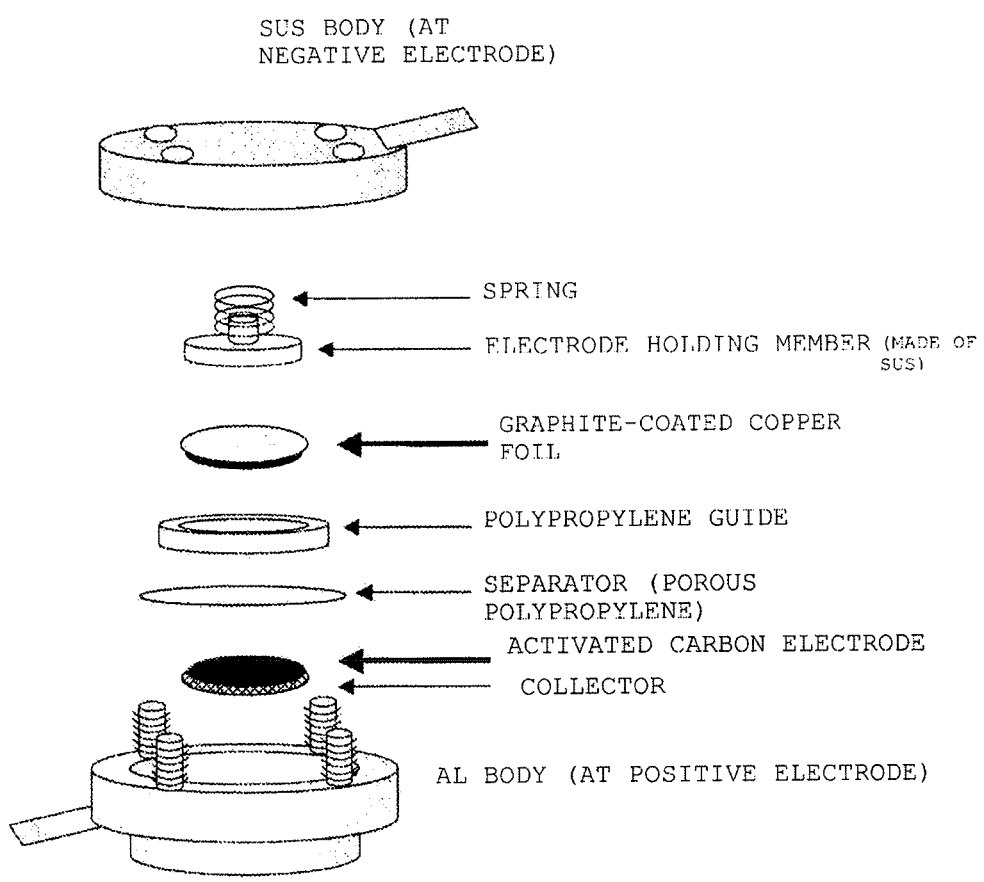
FIG. 21 is a diagram showing the structure of a two-electrode cell for evaluating lithium ion capacitors used in Examples and Comparative Examples.

In order to measure the capacitance of a lithium ion capacitor and perform a durability test, using activated carbon electrodes obtained in Example 4 and Comparative Examples 1 and 3, each two-electrode cell having a structure shown in FIG. 21 was prepared. The two-electrode cell was prepared by placing in series a positive electrode, a separator (for a lithium ion cell), a polypropylene guide and a negative electrode (graphite-coated copper foil) on an aluminum body at the positive electrode having electric wiring, impregnating an electrolyte between the electrodes and further placing an electrode holding member having a spring and a stainless body at the negative electrode having electric wiring on an integrated collector at the negative electrode to sandwich the same between the aluminum body at the positive electrode and the stainless body at the negative electrode. The graphite-coated copper foil of the negative electrode was doped with lithium ions beforehand. The electrolyte was a mixed solution of ethylene carbonate (EC) containing 1.0M concentration of LiPF6 and ethyl methyl carbonate (EMC). The electrolyte is commonly used as an organic electrolyte of a lithium ion capacitor. A stainless body was employed on the bottom of the cell at the negative electrode because aluminum can react with a carbon negative electrode doped with lithium ions. Also, polypropylene guide was used as an electrode guide, because a carbon negative electrode doped with lithium ions has a high reducing property and it can react with a fluorocarbon resin.

(High-Voltage Durability Test)

Figure 22:
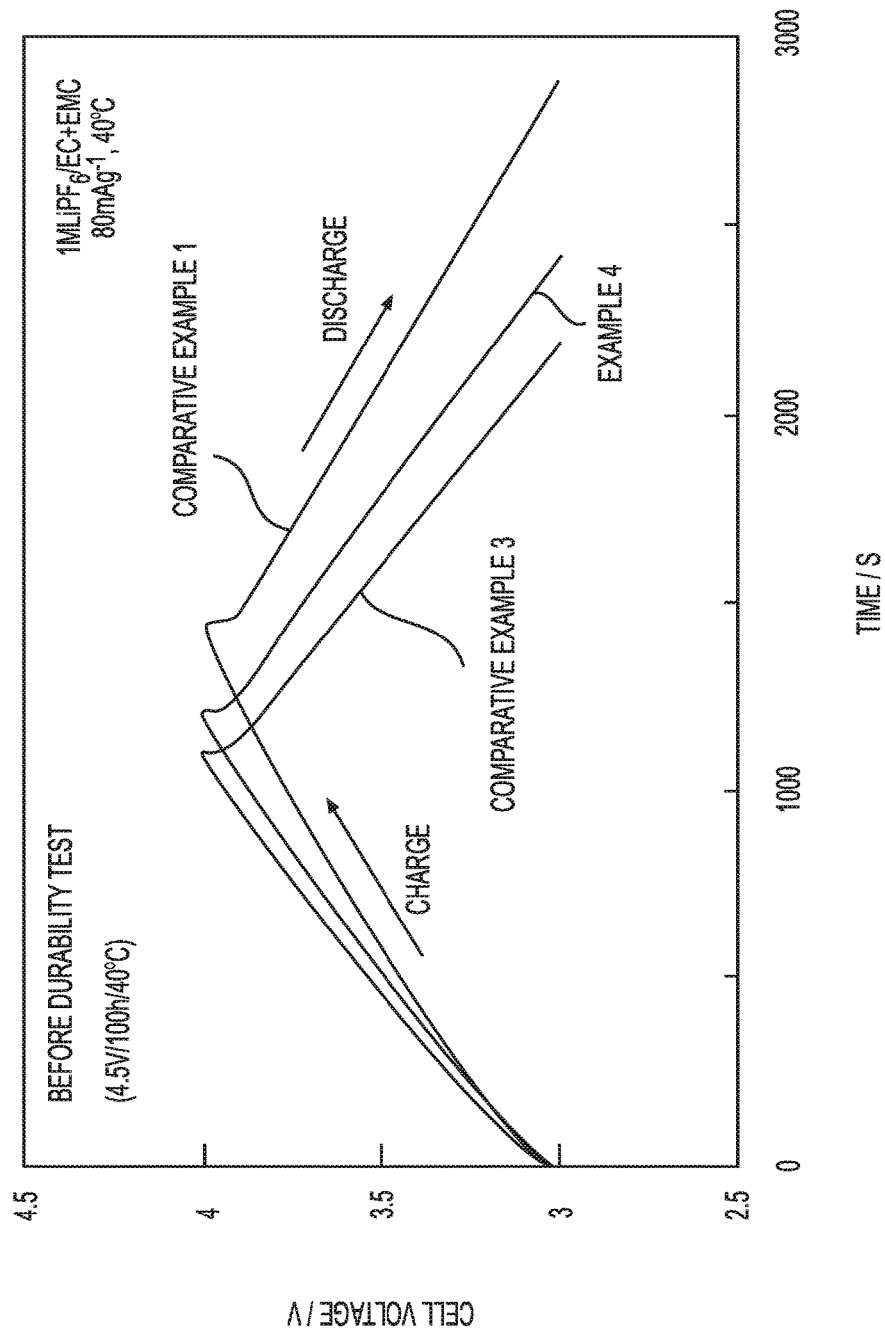
FIG. 22 is a diagram showing charge and discharge curves before durability test of lithium ion capacitors of activated carbons of Example 4 and Comparative Examples 1 and 3.
Figure 23:
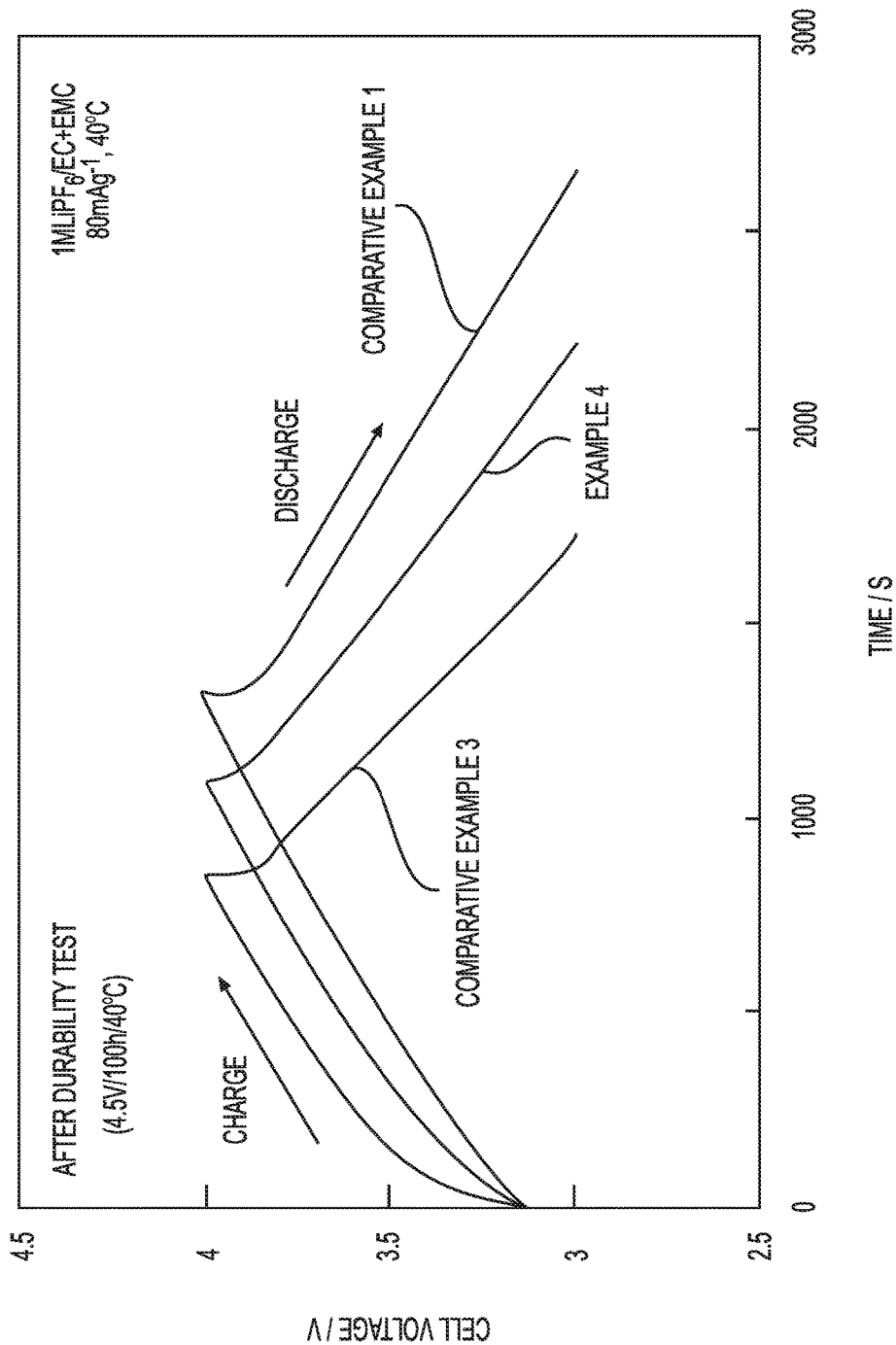
FIG. 23 is a diagram showing charge and discharge curves after durability test of lithium ion capacitors of activated carbons of Example 4 and Comparative Examples 1 and 3.
Figure 24:
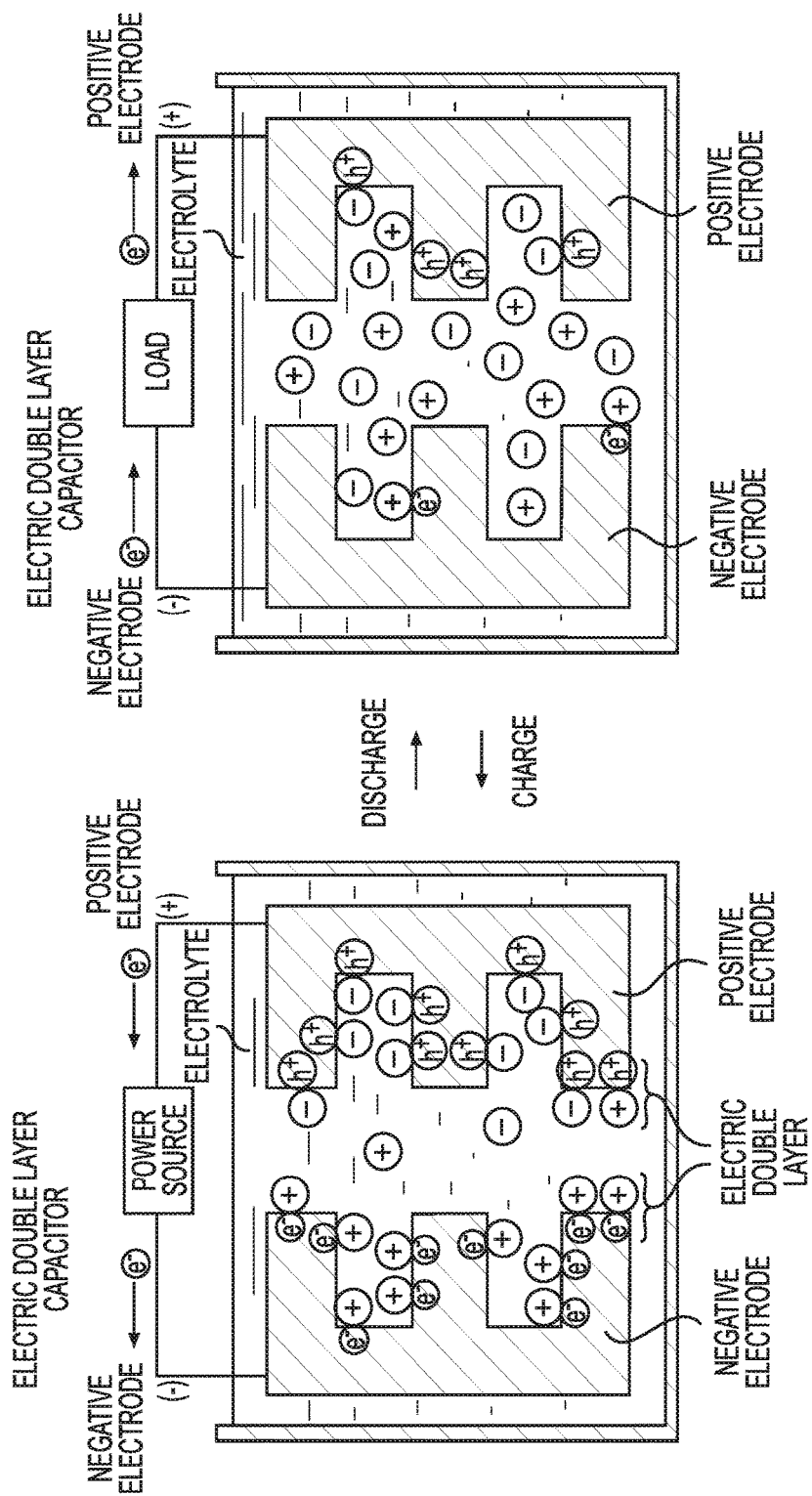
FIG. 24 is a principle diagram showing charge and discharge of a general electric double layer capacitor.
Figure 25:
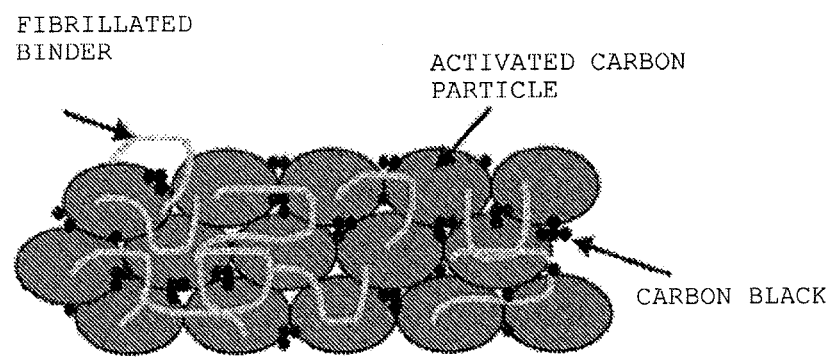
FIG. 25 is a conceptual diagram showing a conventional activated carbon electrode.

The capacitance for evaluation of the durability of a lithium ion capacitor was measured at 40° C. by constant current method (current density: 80 mA/g, measured voltage range: 3 to 4V). First, the 5$^{th}$-cycle capacitance was defined as initial capacitance. Next, after the capacitance was measured, 4.5V voltage was applied to a cell at 40° C. for 100 hours to perform a durability test. Subsequently, after the durability test, the capacitance was measured by constant current method (current density: 80 mA/g, measured voltage range: 3 to 4V). The 5$^{th}$-cycle capacitance was defined as terminal capacitance. The ratio of the capacitance after the durability test to the capacitance before the durability test (ratio of terminal capacitance to initial capacitance) was defined as capacitance retention ratio. FIG. 22 shows charge and discharge curves of a lithium capacitor by constant current method using disk-shaped activated carbons of Example 4 and Comparative Examples 1 and 3 before the durability test, and FIG. 23 shows charge and discharge curves after the durability test.

With reference to FIG. 22, before the durability test, both a lithium ion capacitor using a positive electrode of Example 4 or Comparative Example 1 and a lithium ion capacitor using a molded electrode as a positive electrode of Comparative Example 3 show linear charge and discharge curves typical of a capacitor. Referring to FIG. 23, after the durability test, in Example 4 and Comparative Example 1, charge and discharge curves obtained were almost the same as before the test. However, in Comparative Example 3, the charge and discharge curves after the durability test significantly changed, and the time required for discharge became short. This means that the capacitance declined due to the durability test.

Table 4 shows the listed results of the capacitance before the durability test (initial volumetric capacitance), the capacitance after the durability test (terminal volumetric capacitance) and capacitance retention ratio obtained from the above charge and discharge curves. In Example 4 and Comparative Example 1, terminal volumetric capacitances were higher and the durability to high-voltage charge was more excellent than Comparative Example 3.

TABLE 4

|  | Positive electrode activated carbon | | Initial volumetric capacitance [Fcm$^{-3}$] | Terminal volumetric capacitance [Fcm$^{-3}$] | Capacitance retention ratio [%] |
|---|---|---|---|---|---|
| Example 4 | ML(9) pC-8h | High-density product | 41.4 | 38.5 | 93 |
| Comparative Example 1 | ML(7) C-8h | Conventional type of product | 18.5 | 17.2 | 93 |
| Comparative Example 3 | YP50F | Molded electrode | 37.8 | 30.2 | 80 |

INDUSTRIAL APPLICABILITY

The activated carbon for use in an electrode of a power-storage device produced by the method of the present invention is used in an electrode of a power-storage device such as an electric double layer capacitor and a lithium ion capacitor.

The invention claimed is:

1. An activated carbon for use in an electrode of a power-storage device, wherein the activated carbon comprises uniform consecutive macropores, the size of the macropores distributed is centered in the range of 0.01 to 5 µm, the specific surface area is in the range of 1500 to 2700 m$^2$/g, the micropore volume is in the range of 0.55 to 1.0 ml/g, the average micropore width is in the range of 0.79 to 0.95 nm, and the bulk density is in the range of 0.49 to 1.0 gcm$^{-3}$.

2. An electric double layer capacitor, wherein the activated carbon according to claim 1 is used for an electrode.

3. A lithium ion capacitor, wherein the activated carbon according to claim 1 is used for an electrode.

4. A method for producing an activated carbon for use in an electrode of a power-storage device, comprising the steps of:
adding a pore-forming agent and a cross-linking agent to an aqueous solution prepared by mixing a phenolic resin and polyvinyl alcohol and mixing the same to obtain a mixture, adding and mixing a catalyst for curing the mixture to obtain a reaction liquid, casting the reaction liquid into a predetermined plate-shaped mold, heating and reacting the same for predetermined hours to obtain a reaction product, taking out from the mold and cleaning with water the reaction product, removing the pore-forming agent and an unreacted product therefrom, and drying the same to obtain a plate-shaped porous phenolic resin including uniform consecutive macropores having an average pore diameter in the range of 3 to 35 µm and formed in a three-dimensional network pattern;
immersing the plate-shaped porous phenolic resin with an organic solvent;
pressurizing the plate-shaped porous phenolic resin after taking out the immersed plate-shaped porous phenolic resin from the organic solvent;
heating the plate-shaped porous phenolic resin pressurized to a temperature in the range of room temperature to 700 to 1000° C. in inert gas atmosphere, keeping the temperature in inert gas atmosphere, and carbonizing the plate-shaped porous phenolic resin to obtain a plate-shaped carbonized product; and
activating the plate-shaped carbonized product so that the activation yield is in the range of 40 to 70% to obtain a plate-shaped activated carbon.

5. The method for producing an activated carbon for use in an electrode of a power-storage device according to claim 4, wherein the organic solvent is ketone or alcohol.

6. The method for producing an activated carbon for use in an electrode of a power-storage device according to claim 5, wherein the ketone is acetone.

7. The method for producing an activated carbon for use in an electrode of a power-storage device according to claim 4, wherein the plate-shaped carbonized product is activated by heating the same from room temperature to a temperature in the range of 800 to 900° C. in inert gas atmosphere, and keeping the same under carbon dioxide circulation at the increased temperature.

8. The method for producing an activated carbon for use in an electrode of a power-storage device according to claim 5, wherein the plate-shaped carbonized product is activated by heating the same from room temperature to a temperature in the range of 800 to 900° C. in inert gas atmosphere, and keeping the same under carbon dioxide circulation at the increased temperature.

9. The method for producing an activated carbon for use in an electrode of a power-storage device according to claim 6, wherein the plate-shaped carbonized product is activated by heating the same from room temperature to a temperature in the range of 800 to 900° C. in inert gas atmosphere, and keeping the same under carbon dioxide circulation at the increased temperature.

10. The method for producing an activated carbon for use in an electrode of a power-storage device according to claim 4, wherein the predetermined shape of the mold is a block or plate, and when the predetermined shape of the mold is a block, a step of cutting out the dried reaction product in the form of a plate is included.

11. An electric double layer capacitor, wherein an activated carbon produced by the method according to claim 4 is used for an electrode.

12. An electric double layer capacitor, wherein an activated carbon produced by the method according to claim 5 is used for an electrode.

13. An electric double layer capacitor, wherein an activated carbon produced by the method according to claim 6 is used for an electrode.

14. An electric double layer capacitor, wherein an activated carbon produced by the method according to claim 7 is used for an electrode.

15. A lithium ion capacitor, wherein an activated carbon produced by the method according to claim 4 is used for an electrode.

16. A lithium ion capacitor, wherein an activated carbon produced by the method according to claim 5 is used for an electrode.

17. A lithium ion capacitor, wherein an activated carbon produced by the method according to claim 6 is used for an electrode.

18. A lithium ion capacitor, wherein an activated carbon produced by the method according to claim 7 is used for an electrode.

* * * * *